(12) United States Patent
Lee

(10) Patent No.: US 12,487,432 B2
(45) Date of Patent: Dec. 2, 2025

(54) LENS DRIVING DEVICE, AND CAMERA MODULE AND OPTICAL DEVICE INCLUDING SAME

(71) Applicant: LG INNOTEK CO., LTD., Seoul (KR)

(72) Inventor: Sung Guk Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 430 days.

(21) Appl. No.: 18/059,127

(22) Filed: Nov. 28, 2022

(65) Prior Publication Data

US 2023/0089048 A1 Mar. 23, 2023

Related U.S. Application Data

(63) Continuation of application No. 16/616,791, filed as application No. PCT/KR2018/005588 on May 16, 2018, now Pat. No. 11,561,362.

(30) Foreign Application Priority Data

May 26, 2017 (KR) .......................... 10-2017-0065275

(51) Int. Cl.
| | |
|---|---|
| *G02B 7/08* | (2021.01) |
| *G02B 27/64* | (2006.01) |

(Continued)

(52) U.S. Cl.
CPC ................. *G02B 7/08* (2013.01); *G03B 3/10* (2013.01); *G03B 13/36* (2013.01); *H02K 3/46* (2013.01);

(Continued)

(58) Field of Classification Search
CPC ... G02B 7/08; G02B 7/09; G03B 3/10; G03B 13/36

See application file for complete search history.

(56) References Cited

U.S. PATENT DOCUMENTS

| | | | |
|---|---|---|---|
| 4,842,392 A | 6/1989 | Nakamura et al. | |
| 9,360,653 B2 * | 6/2016 | Lee ........................ | G03B 30/00 |

(Continued)

FOREIGN PATENT DOCUMENTS

| | | |
|---|---|---|
| CN | 1160218 A | 9/1997 |
| CN | 1945944 A | 4/2007 |

(Continued)

OTHER PUBLICATIONS

Machine translation of WO2010/134706 retrieved electronically from PE2E Search Mar. 25, 2025 (Year: 2025).*

(Continued)

*Primary Examiner* — Cara E Rakowski
(74) *Attorney, Agent, or Firm* — Saliwanchik, Lloyd & Eisenschenk

(57) ABSTRACT

An embodiment comprises: a housing; a bobbin disposed in the housing; a coil disposed on the bobbin; a magnet disposed in a side portion of the housing, and including a first side surface facing the coil and a second side surface opposite to the first side surface; and a yoke disposed in the upper portion of the housing and overlapping the magnet in the optical axis direction, wherein: the centerline of the magnet is located on one side with reference to a reference line; a first groove adjoining one end of the first side surface of the magnet is disposed at a first end of the magnet; a second groove adjoining the other end of the first side surface of the magnet is disposed at a second end of the magnet; the reference line passes through the center of the housing and is perpendicular to the outer surface of the side portion of the housing where the magnet is disposed; and the centerline of the magnet is a straight line passing through the center between the first end and the second end of the magnet and perpendicular to the first side surface of the magnet.

19 Claims, 22 Drawing Sheets

(51) Int. Cl.
  *G03B 3/10* (2021.01)
  *G03B 5/00* (2021.01)
  *G03B 13/36* (2021.01)
  *H02K 3/46* (2006.01)
  *H02K 41/035* (2006.01)

(52) U.S. Cl.
  CPC ....... *H02K 41/0356* (2013.01); *G02B 27/646* (2013.01); *G03B 5/00* (2013.01); *G03B 2205/0007* (2013.01); *G03B 2205/0069* (2013.01); *H02K 2203/12* (2013.01)

(56) References Cited

U.S. PATENT DOCUMENTS

| | | | | |
|---|---|---|---|---|
| 9,547,216 | B2* | 1/2017 | Jung | H04N 23/67 |
| 9,618,768 | B2* | 4/2017 | Yeo | G02B 7/02 |
| 9,769,363 | B2* | 9/2017 | Cho | H04N 23/57 |
| 9,860,432 | B2* | 1/2018 | Yeo | G02B 7/08 |
| 9,977,255 | B2* | 5/2018 | Park | G02B 27/64 |
| 10,122,938 | B2* | 11/2018 | Park | H04N 23/55 |
| 10,284,787 | B2* | 5/2019 | Park | H04N 23/75 |
| 10,338,404 | B2* | 7/2019 | Park | H04N 23/51 |
| 10,451,891 | B2* | 10/2019 | Cho | G02B 7/08 |
| 10,495,898 | B2* | 12/2019 | Park | G03B 3/10 |
| 10,520,700 | B2* | 12/2019 | Lee | G01D 5/145 |
| 10,531,012 | B2* | 1/2020 | Park | G02B 27/646 |
| 10,578,828 | B2* | 3/2020 | Lee | H04N 23/57 |
| 10,656,374 | B2* | 5/2020 | Kim | H04N 23/682 |
| 10,656,375 | B2* | 5/2020 | Kim | H04N 23/60 |
| 10,866,383 | B2* | 12/2020 | Son | G02B 7/025 |
| 10,928,607 | B2* | 2/2021 | Shin | G02B 27/64 |
| 10,935,751 | B2* | 3/2021 | Shin | G03B 3/10 |
| 10,935,752 | B2* | 3/2021 | Lee | G02B 7/10 |
| 10,969,603 | B2* | 4/2021 | Park | H04M 1/0264 |
| 11,079,567 | B2* | 8/2021 | Lee | G02B 7/09 |
| 11,086,098 | B2* | 8/2021 | Lee | H04N 23/57 |
| 11,131,831 | B2* | 9/2021 | Cho | H02K 1/17 |
| 11,231,637 | B2* | 1/2022 | Min | G03B 5/02 |
| 11,239,024 | B2* | 2/2022 | Lee | H04N 23/51 |
| 11,294,142 | B2* | 4/2022 | Lee | G03B 3/10 |
| 11,300,758 | B2* | 4/2022 | Lee | H04N 23/55 |
| 11,333,846 | B2* | 5/2022 | Park | G02B 7/08 |
| 11,360,321 | B2* | 6/2022 | Park | H04N 23/55 |
| 11,378,769 | B2* | 7/2022 | Park | G03B 3/10 |
| 11,378,773 | B2* | 7/2022 | Lee | H04N 23/55 |
| 11,409,071 | B2* | 8/2022 | Park | G02B 7/09 |
| 11,415,861 | B2* | 8/2022 | Park | G03B 3/10 |
| 11,428,950 | B2* | 8/2022 | Cho | G03B 3/10 |
| 11,520,159 | B2* | 12/2022 | Lee | G02B 27/646 |
| 11,561,362 | B2* | 1/2023 | Lee | H02K 41/0356 |
| 11,662,549 | B2* | 5/2023 | Lee | G03B 19/22 348/294 |
| 11,762,216 | B2* | 9/2023 | Min | G02B 7/08 359/557 |
| 11,774,775 | B2* | 10/2023 | Park | H04N 23/51 359/557 |
| 11,824,418 | B2* | 11/2023 | Park | G03B 3/10 |
| 11,874,523 | B2* | 1/2024 | Lee | G03B 3/10 |
| 11,921,346 | B2* | 3/2024 | Lee | G03B 3/10 |
| 11,936,971 | B2* | 3/2024 | Park | H04N 23/57 |
| 11,994,693 | B2* | 5/2024 | Park | G03B 5/00 |
| 12,035,026 | B2* | 7/2024 | Park | H04N 23/54 |
| 12,061,373 | B2* | 8/2024 | Park | H02K 11/33 |
| 12,066,689 | B2* | 8/2024 | Park | H04N 23/67 |
| 12,066,692 | B2* | 8/2024 | Lee | H04N 23/687 |
| 12,111,564 | B2* | 10/2024 | Park | G02B 27/646 |
| 12,176,145 | B2* | 12/2024 | Son | G02B 27/646 |
| 12,235,470 | B2* | 2/2025 | Jung | G02B 27/646 |
| 12,237,746 | B2* | 2/2025 | Kim | H04N 23/60 |
| 12,242,132 | B2* | 3/2025 | Park | G02B 27/64 |
| 2004/0075351 | A1 | 4/2004 | Ueda et al. | |
| 2007/0273364 | A1 | 11/2007 | Takei et al. | |
| 2015/0296106 | A1 | 10/2015 | Oh | |
| 2015/0323758 | A1* | 11/2015 | Lee | G02B 7/04 359/824 |
| 2017/0059880 | A1 | 3/2017 | Fujinaka | |
| 2019/0107684 | A1 | 4/2019 | Osaka et al. | |
| 2019/0107685 | A1 | 4/2019 | Kim et al. | |
| 2019/0204532 | A1 | 7/2019 | Konuma et al. | |

FOREIGN PATENT DOCUMENTS

| | | |
|---|---|---|
| CN | 104902149 A | 9/2015 |
| CN | 104935792 A | 9/2015 |
| CN | 105607383 A | 5/2016 |
| JP | 2007-25577 A | 2/2007 |
| JP | 2007-78907 A | 3/2007 |
| JP | 2016-38444 A | 3/2016 |
| KR | 10-0919116 B1 | 9/2009 |
| KR | 10-2012-0010421 A | 2/2012 |
| KR | 10-2012-0053836 A | 5/2012 |
| KR | 101431182 B1 * | 8/2014 |
| KR | 10-2015-0104703 A | 9/2015 |
| KR | 10-156107 B1 | 11/2015 |
| KR | 10-2016-0045384 A | 4/2016 |
| KR | 10-2016-0059143 A | 5/2016 |
| KR | 10-2016-0150628 A | 12/2016 |
| KR | 10-2017-0002804 A | 1/2017 |
| WO | 2010/134706 A2 | 11/2010 |
| WO | 2013/121788 A1 | 8/2013 |
| WO | 2016/021391 A1 | 2/2016 |
| WO | 2016/199394 A1 | 12/2016 |
| WO | 2017/043884 A1 | 3/2017 |

OTHER PUBLICATIONS

Machine translation of KR101431182 B1 retrieved electronically from Espacenet Mar. 26, 2025 (Year: 2025).*
U.S. Appl. No. 18/886,243 Kim et al. submitted Sep. 16, 2024 (Year: 2024).*
U.S. Appl. No. 18/812,570 Park submitted Aug. 22, 2024 (Year: 2024).*
U.S. Appl. No. 18/770,057 Lee submitted Jul. 11, 2024 (Year: 2024).*
U.S. Appl. No. 18/775,117 Park et al. submitted Jul. 17, 2024 (Year: 2024).*
U.S. Appl. No. 18/643,515 Park et al. submitted Apr. 23, 2024 (Year: 2024).*
U.S. Appl. No. 18/582,168 Park et al. submitted Feb. 20, 2024 (Year: 2024).*
U.S. Appl. No. 18/254,650 Jung submitted May 26, 2023 (Year: 2023).*
International Search Report in International Application No. PCT/KR2018/005588, filed May 16, 2018.
Supplementary European Search Report dated Jan. 12, 2021 in European Application No. 18805346.6.
Office Action dated Jun. 3, 2021 in Chinese Application No. 201880034394.9.
Office Action dated Aug. 20, 2021 in Korean Application No. 10-2017-0065275.
Jin, B. et al., "Position-movable lens driven by dielectric elastomer actuator," Optical Engineering, Jul. 2016, 55(7):1-7, SPIE.
Zhang, K., "Research on Patent Development of Lens Auto-Focus Drive," 2016, pp. 1-2, along with its English Abstract.
Notice of Allowance dated Jan. 6, 2022 in Chinese Application No. 201880034394.9.
Office Action dated Mar. 7, 2022 in U.S. Appl. No. 16/616,791.
Notice of Allowance dated Aug. 29, 2022 in U.S. Appl. No. 16/616,791.
European Search Report dated Apr. 5, 2023 in European Application No. 18 805 346.6.
Office Action dated Nov. 24, 2023 in Chinese Application No. 202210276300.7.

\* cited by examiner

FIG.15A
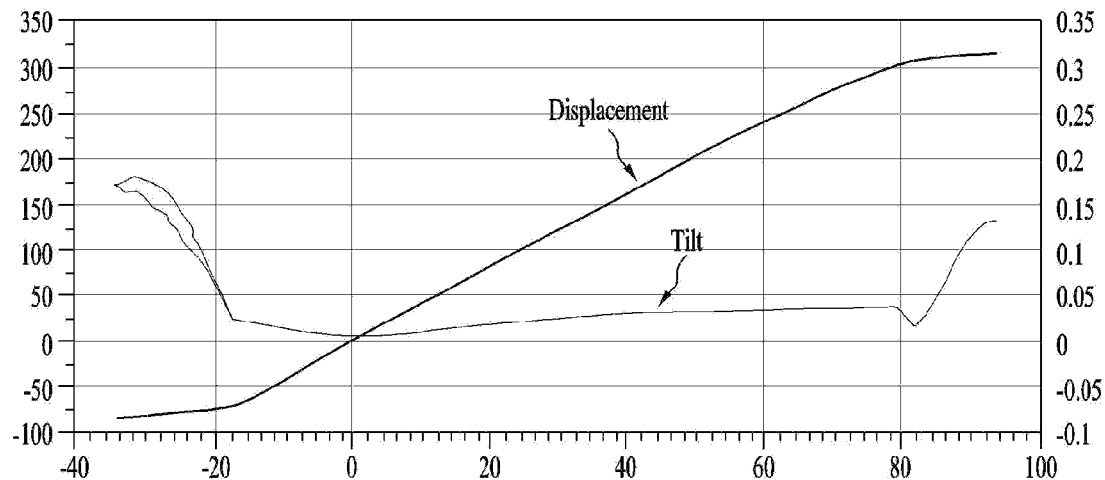
FIG.15B
| Test Items | Value |
|---|---|
| Dynamic Tilt P1(Degree) | 0.033 |
| Sensitivity (um/mA) | 4.108 |
FIG.16A
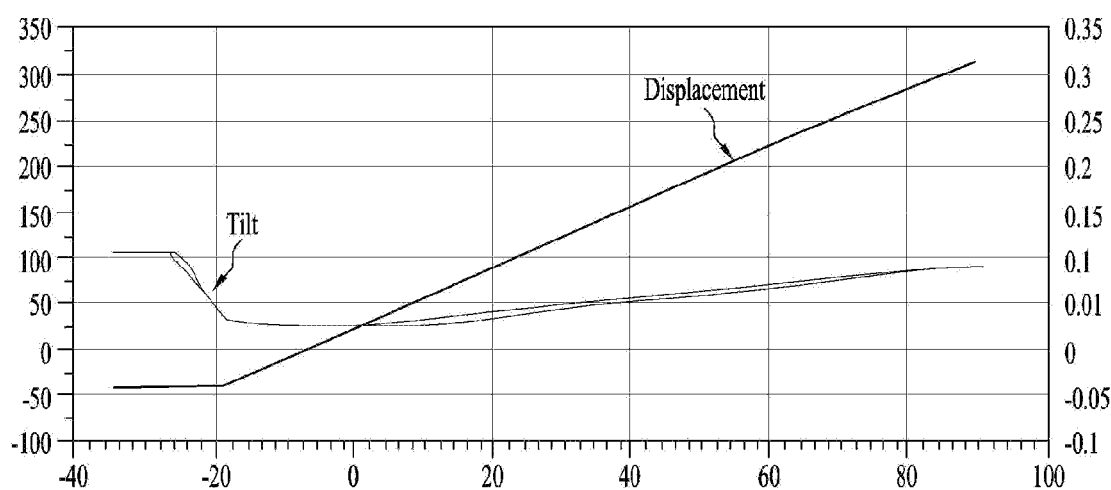

| Test Items | Value |
|---|---|
| Dynamic Tilt P1(Degree) | 0.052 |
| Sensitivity (um/mA) | 3.365 |

| Test Items | Value |
|---|---|
| Dynamic Tilt P1 (Degree) | 0.022 |
| Sensitivity (um/mA) | 4.519 |

FIG.18A
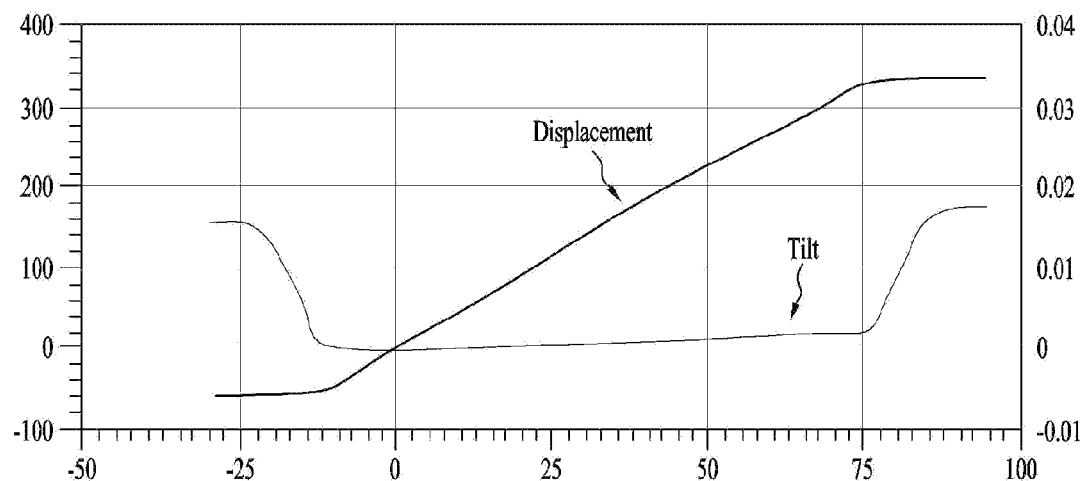
FIG.18B
| Test Items | Value |
|---|---|
| Dynamic Tilt P1 (Degree) | 0.021 |
| Sensitivity (um/mA) | 4.316 |
FIG.19
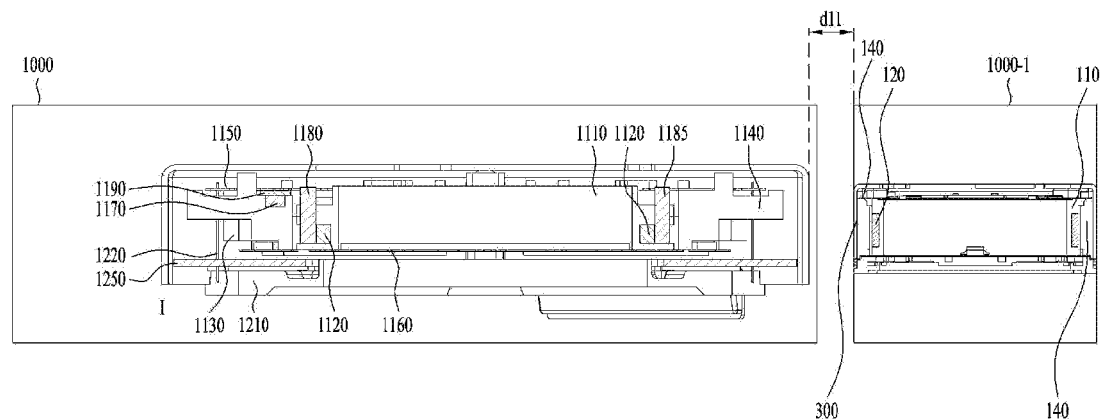

LENS DRIVING DEVICE, AND CAMERA MODULE AND OPTICAL DEVICE INCLUDING SAME

CROSS-REFERENCE TO RELATED APPLICATIONS

This application is a continuation of U.S. application Ser. No. 16/616,791, filed Nov. 25, 2019; which is the U.S. national stage application of International Patent Application No. PCT/KR2018/005588, filed May 16, 2018, which claims the benefit under 35 U.S.C. § 119 of Korean Application No. 10-2017-0065275, filed May 26, 2017, the disclosures of each of which are incorporated herein by reference in their entirety.

TECHNICAL FIELD

Embodiments relate to a lens moving apparatus, and a camera module and an optical instrument including the same.

BACKGROUND ART

A mobile phone or a smartphone having mounted therein a camera module that captures and stores images or video of a subject has been developed. In general, the camera module may include a lens, an image sensor module, and a voice coil motor (VCM) for adjusting the distance between the lens and the image sensor module to adjust the focal distance of the lens, i.e. to perform autofocus.

DISCLOSURE

Technical Problem

Embodiments provide a lens moving apparatus capable of securing AF driving force and reducing magnetic field interference with an adjacent lens moving apparatus, and a camera module and an optical instrument including the same.

Technical Solution

In one embodiment, a lens moving apparatus includes a housing, a bobbin disposed in the housing, a coil disposed at the bobbin, a magnet disposed at the side portion of the housing, the magnet including a first side surface facing the coil and a second side surface opposite the first side surface, and a yoke disposed at the upper portion of the housing so as to overlap the magnet in an optical-axis direction, wherein a center line of the magnet is located at one side with respect to a baseline, a first recess abutting one end of the first side surface of the magnet is provided in a first end of the magnet, a second recess abutting the other end of the first side surface of the magnet is provided in a second end of the magnet, the baseline is a straight line that passes through the center of the housing and that is perpendicular to the outer surface of the side portion of the housing at which the magnet is disposed, and the center line of the magnet is a straight line that passes through the center of the magnet between the first end and the second end thereof and that is perpendicular to the first side surface of the magnet.

The first recess may be formed by chamfering one corner located at the first end of the magnet, and the second recess may be formed by chamfering one corner located at the second end of the magnet.

The horizontal length of the second recess may be longer than the horizontal length of the first recess, and each of the horizontal direction of the second recess and the horizontal direction of the first recess may be a direction parallel to a direction from the first end to the second end of the magnet.

The center line of the magnet may be spaced apart from the baseline by K (K being a positive real number), K being greater than 0 and equal to or less than 0.5 mm.

A center line of the yoke may be located within a range from 0 to 0.5 mm toward the center line of the magnet from the baseline with respect to the baseline.

The horizontal length of the second side surface of the magnet may be longer than the horizontal length of the first side surface of the magnet, and each of the horizontal direction of the first side surface of the magnet and the horizontal direction of the second side surface of the magnet may be a direction parallel to a direction from the first end to the second end of the magnet.

The yoke may include a body, a first extension portion connected to the body, the first extension portion extending from the center line of the magnet toward the first end of the magnet, and a second extension portion connected to the body, the second extension portion extending from the center line of the magnet toward the second end of the magnet.

Each of the vertical length of the first extension portion and the vertical length of the second extension portion may be smaller than the vertical length of the body, and each of the vertical direction of the first extension portion, the vertical direction of the second extension portion, and the vertical direction of the body is a direction perpendicular to the horizontal direction of the first side surface of the magnet.

The yoke may be disposed in a symmetrical fashion with respect to the baseline and may be disposed in an asymmetrical fashion with respect to the center line of the magnet.

The lens moving apparatus may further include an upper elastic member coupled to the upper portion of the housing, wherein the yoke may be disposed on the upper elastic member, and the housing may include protrusions coupled to the upper elastic member and to the yoke.

Advantageous Effects

According to embodiments, it is possible to secure AF driving force and to reduce magnetic field interference with an adjacent lens moving apparatus.

DESCRIPTION OF DRAWINGS

FIG. 15A shows displacement and tilt of an AF operation unit depending on driving current at room temperature when the yoke unit according to the embodiment is not provided.

FIG. 15B shows a tilt value of displacement of the AF operation unit and sensitivity of the AF operation unit of FIG. 15A.

FIG. 16A shows displacement and tilt of the AF operation unit depending on driving current at an ambient temperature of 99° C. when the yoke unit according to the embodiment is not provided.

FIG. 18A shows displacement and tilt of the AF operation unit depending on driving current at an ambient temperature of 99° C. when the yoke unit is provided.

FIG. 18B shows a tilt value of displacement of the AF operation unit and sensitivity of the AF operation unit of FIG. 18A.

FIG. 19 shows an embodiment of a dual camera module.

BEST MODE

Figure 1:
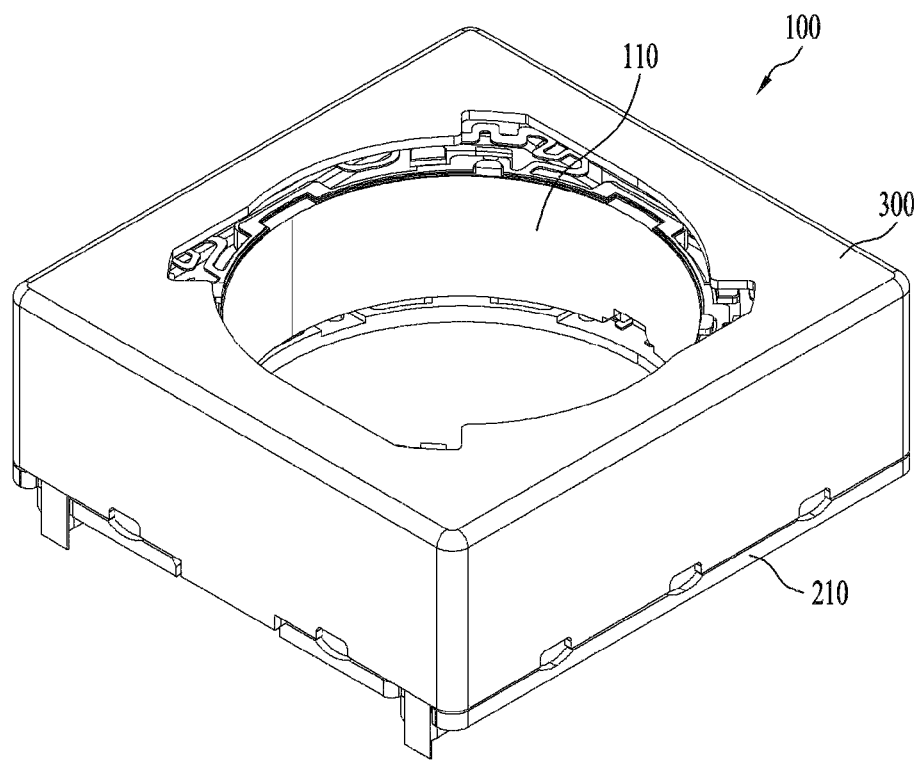
FIG. 1 is a perspective view of a lens moving apparatus according to an embodiment.

Reference will now be made in detail to embodiments, examples of which are illustrated in the accompanying drawings.

In the following description of the embodiments, it will be understood that, when each element is referred to as being "on" or "under" another element, it can be "directly" on or under another element or can be "indirectly" formed such that an intervening element is also present. In addition, when an element is referred to as being "on" or "under," "under the element" as well as "on the element" may be included based on the element.

In addition, relational terms, such as "first," "second," "on/upper part/above," and "under/lower part/below," are used only to distinguish between one subject or element and another subject or element without necessarily requiring or involving any physical or logical relationship or sequence between such subjects or elements. In addition, wherever possible, the same reference numbers will be used throughout the drawings to refer to the same or like parts.

In addition, the terms "include," "comprise" and "have" mean that elements can be inherent unless otherwise stated. Therefore, the terms should be interpreted not to exclude other elements but to further include such other elements. In addition, the term "corresponding" may mean at least one of "opposite" or "overlapping."

For convenience of description, the lens moving apparatus will be described using a Cartesian coordinate system (x, y, z). However, the disclosure is not limited thereto. Other different coordinate systems may be used. In the drawings, an x-axis direction and a y-axis direction are directions perpendicular to a z-axis direction, which is an optical-axis direction. The optical axis (OA) direction or the z-axis direction, which is parallel to the optical-axis (OA) direction, may be referred to as a "first direction," the x-axis direction may be referred to as a "second direction," and the y-axis direction may be referred to as a "third direction."

A lens moving apparatus according to an embodiment is an autofocusing apparatus that automatically forms the focus of an image of a subject on the surface of an image sensor. That is, the lens moving apparatus according to the embodiment may move an optical module including at least one lens in the first direction, which is parallel to the optical-axis direction, to perform an autofocusing operation.

Hereinafter, the lens moving apparatus may mean a "voice coil motor," a "lens moving motor," or an "actuator," which may be used instead thereof.

Figure 2:
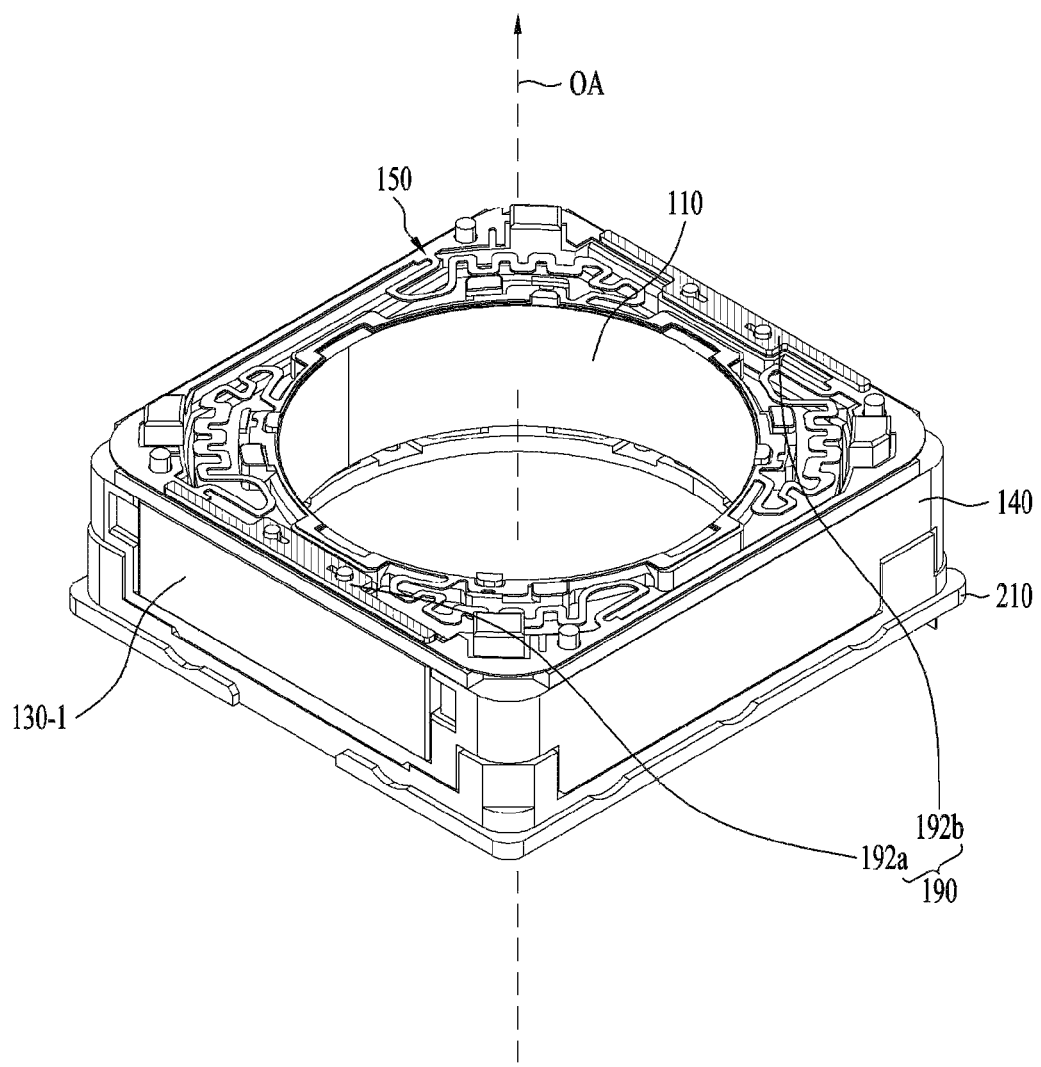
FIG. 2 is a perspective view of the lens moving apparatus of FIG. 1 with a cover member removed.
Figure 3A:
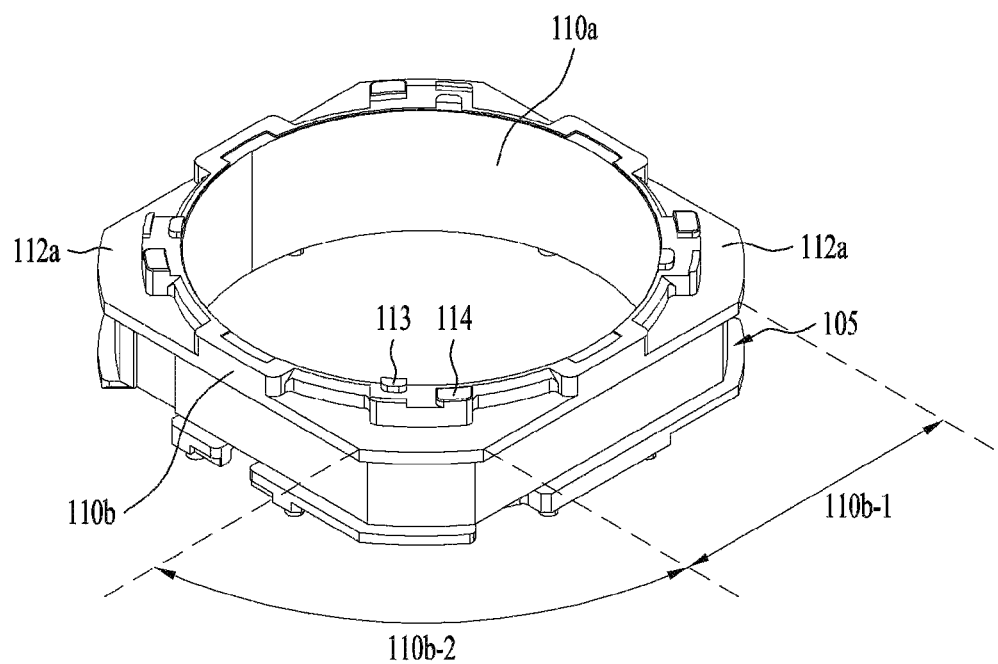
FIG. 3A is a first perspective view of a bobbin shown in FIG. 2.
Figure 3B:
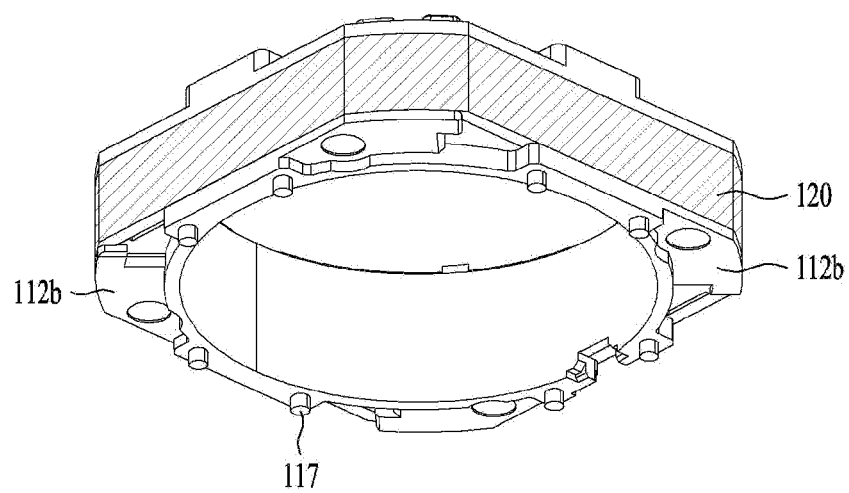
FIG. 3B is a perspective view showing coupling between the bobbin and a coil.
Figure 4A:
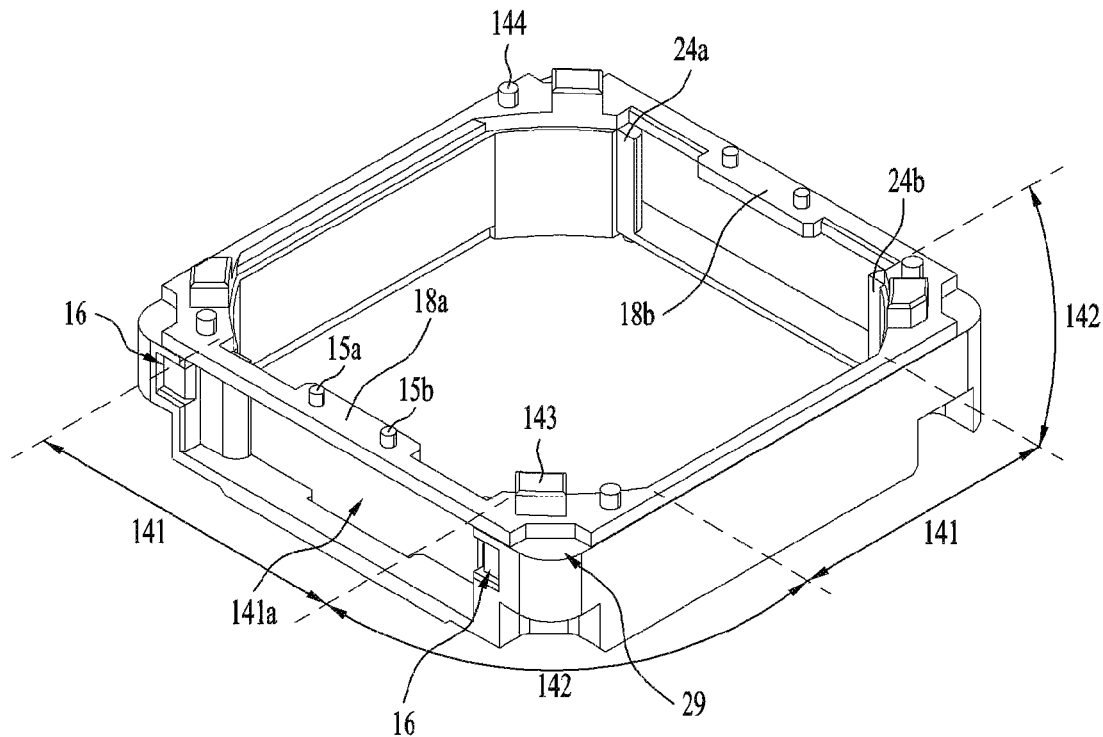
FIG. 4A is a perspective view of a housing of FIG. 2.
Figure 4B:
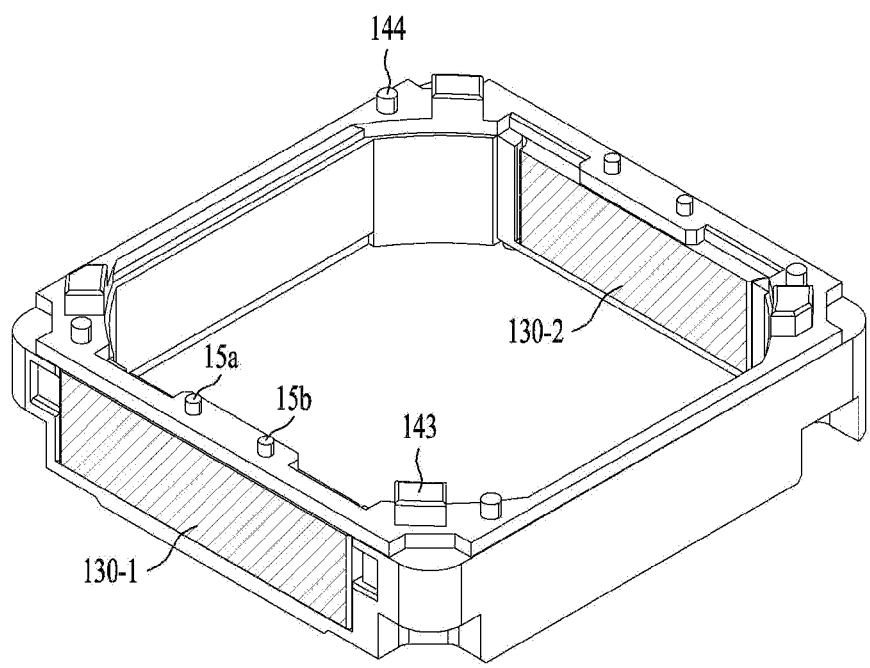
FIG. 4B is a first perspective view showing coupling between the housing and a magnet of FIG. 2.
Figure 4C:
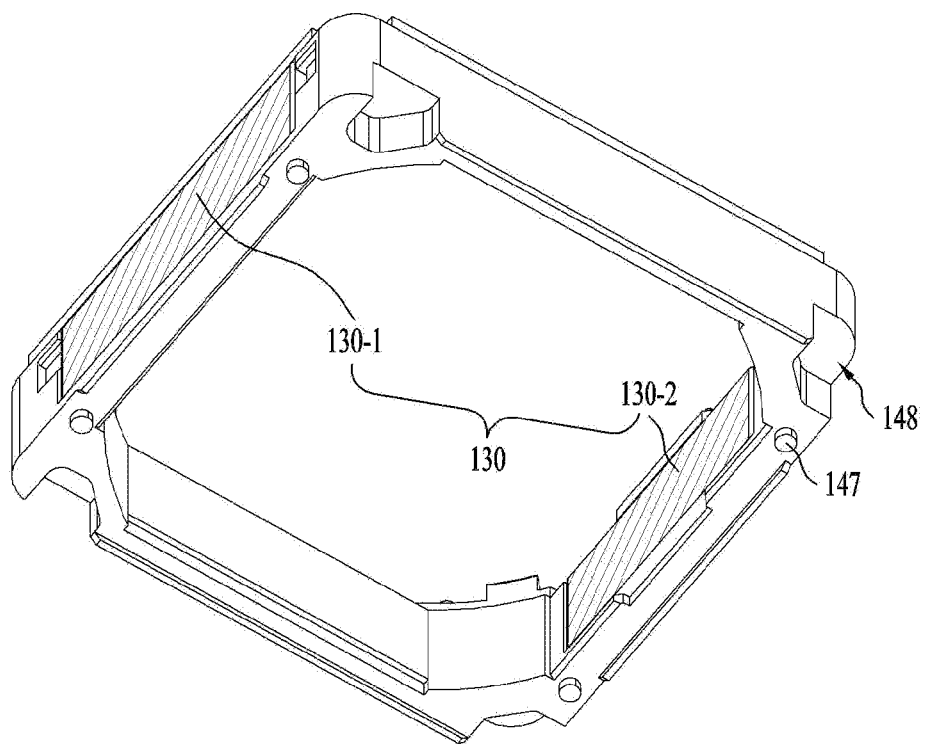
FIG. 4C is a second perspective view showing coupling between the housing and the magnet of FIG. 2.
Figure 5:
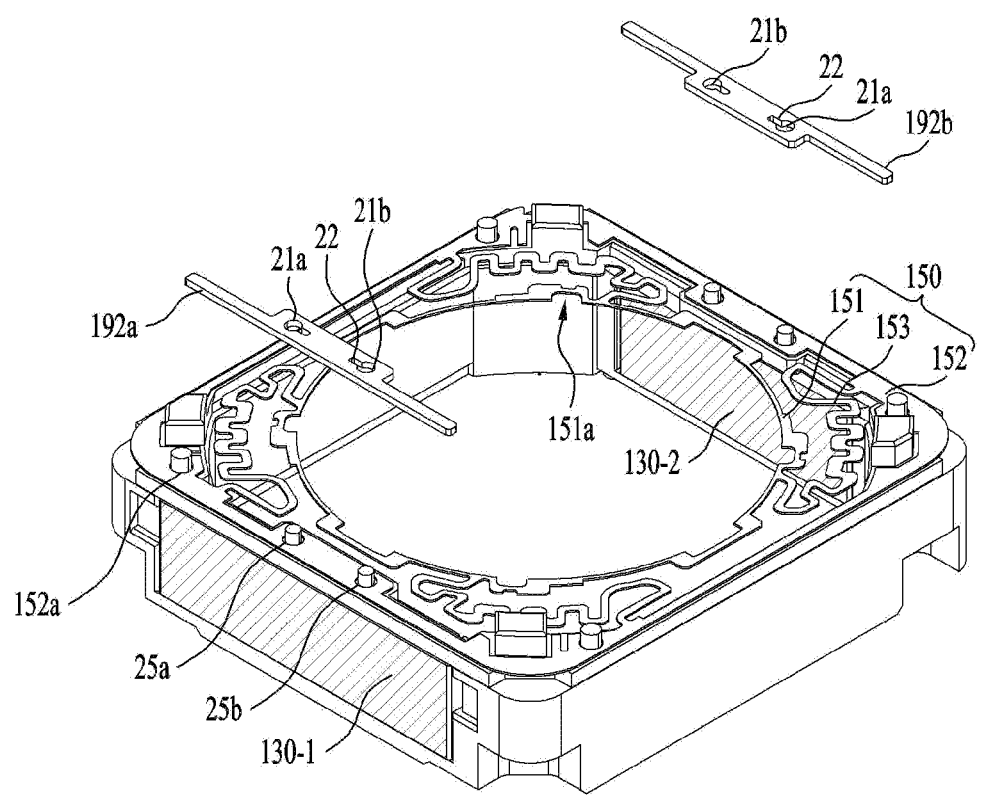
FIG. 5 is perspective view of the housing, the magnet, an upper elastic member, and a yoke.
Figure 6:
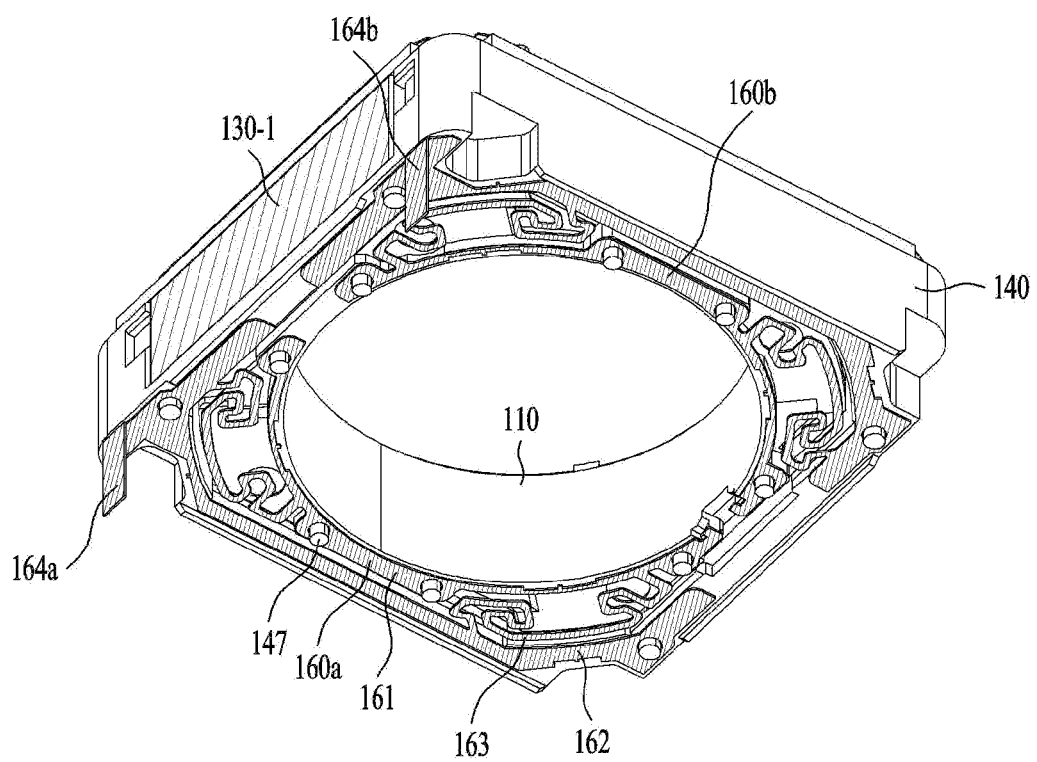
FIG. 6 is a perspective view of the housing and a lower elastic member.
Figure 7A:
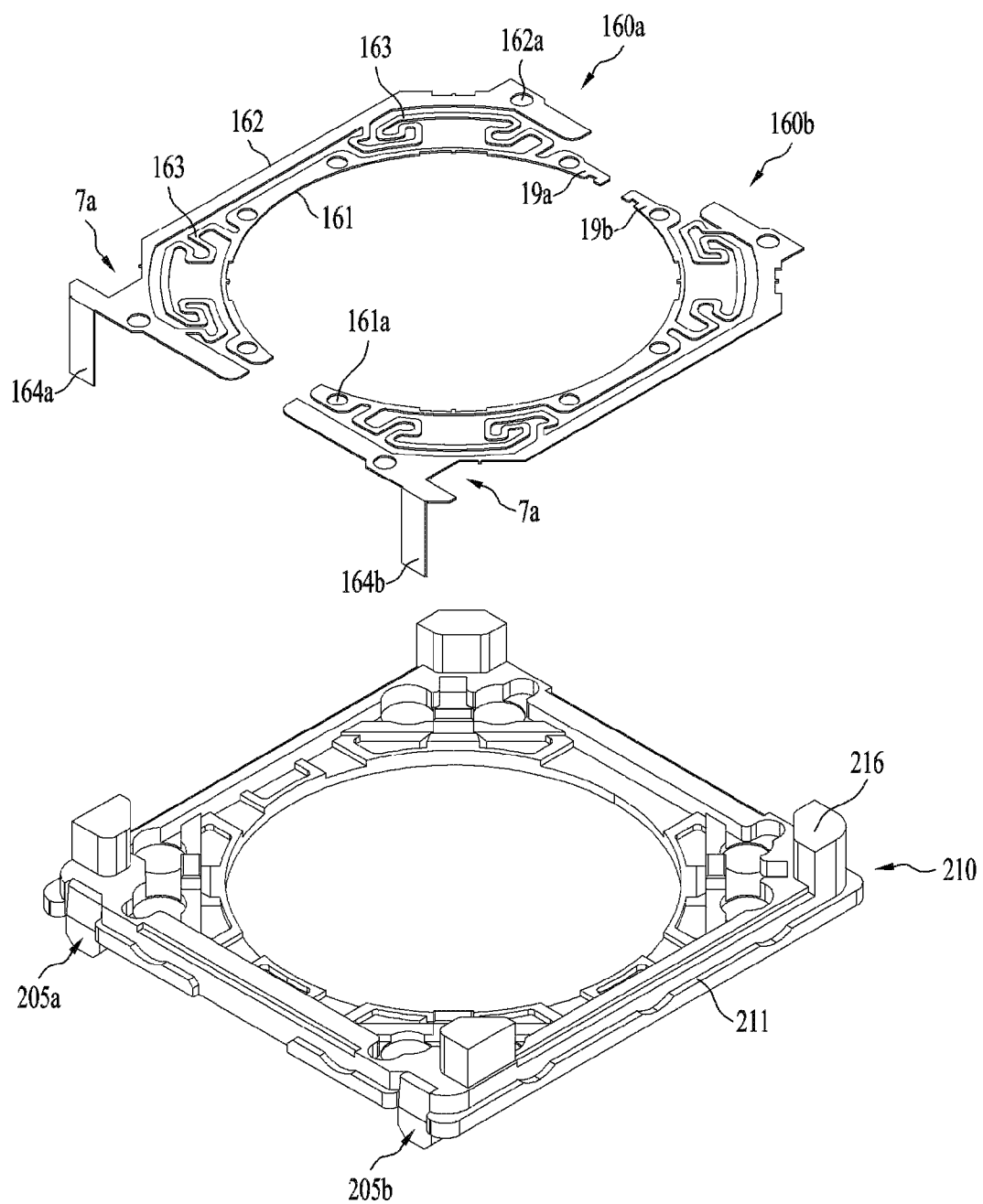
FIG. 7A is a first perspective view of a base and the lower elastic member.
Figure 7B:
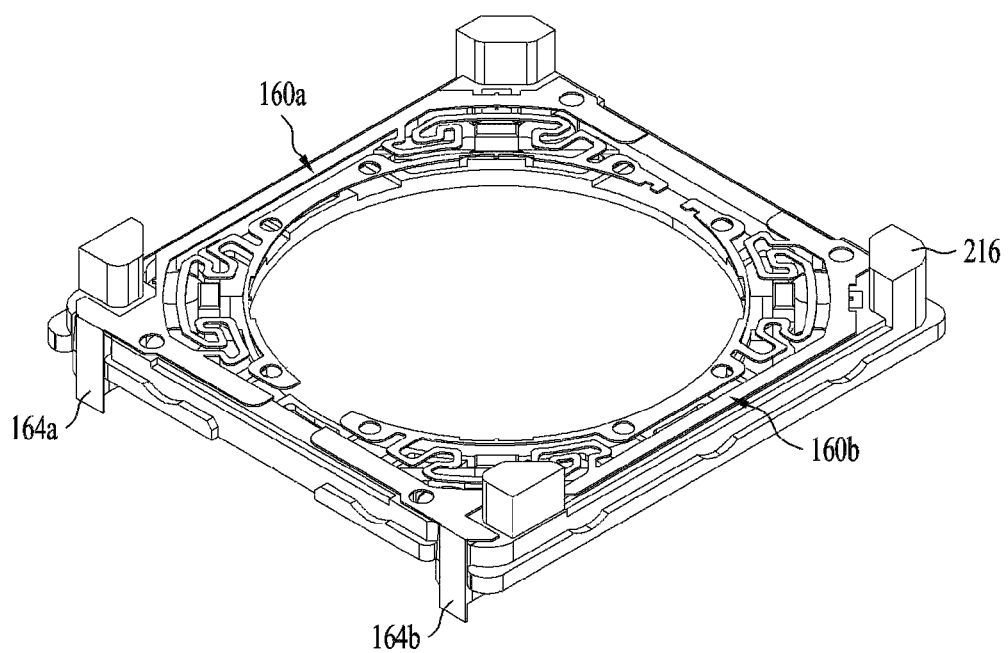
FIG. 7B is a second perspective view of the base and the lower elastic member.

FIG. 1 is a perspective view of a lens moving apparatus 100 according to an embodiment, FIG. 2 is a perspective view of the lens moving apparatus 100 of FIG. 1 with a cover member 300 removed, FIG. 3A is a first perspective view of a bobbin 110 shown in FIG. 2, FIG. 3B is a perspective view showing coupling between the bobbin 110 and a coil 120, FIG. 4A is a perspective view of a housing 140 of FIG. 2, FIG. 4B is a first perspective view showing coupling between the housing 140 and a magnet 130 of FIG. 2, FIG. 4C is a second perspective view showing coupling between the housing 140 and the magnet of FIG. 2, FIG. 5 is perspective view of the housing 140, the magnet 130, an upper elastic member 150, and a yoke 192a and 192b, FIG. 6 is a perspective view of the housing 140 and a lower elastic member 160, FIG. 7A is a first perspective view of a base 210 and the lower elastic member 160, and FIG. 7B is a second perspective view of the base 210 and the lower elastic member 160.

Referring to FIGS. 1 to 7B, the lens moving apparatus 100 may include a bobbin 110, a coil 120, a magnet 130, a housing 140, an upper elastic member 150, a lower elastic member 160, and a yoke unit 190.

In addition, the lens moving apparatus 100 may further include a cover member 300 and a base 210.

First, the cover member 300 will be described.

The cover member 300 receives the other components 110, 120, 130, 140, 150, 160, and 190 in a receiving space formed together with the base 210.

The cover member 300 may be formed in the shape of a box, the lower portion of which is open and which includes an upper plate and side plates. The lower ends of the side plates of the cover member 300 may be coupled to the upper portion of the base 210. The shape of the upper plate of the cover member 300 may be polygonal, for example, quadrangular or octagonal.

The cover member 300 may be provided in the upper plate thereof with an opening, through which a lens (not shown) coupled to the bobbin 110 is exposed to external light.

The cover member 300 may be made of a nonmagnetic material, such as SUS.

As the cover member 300 made of the nonmagnetic material is used, it is possible to inhibit a phenomenon in which the magnet 130 attracts the cover member 300.

In addition, as the nonmagnetic cover member is used, it is possible to reduce magnetic field interference with an adjacent lens moving apparatus, such as a lens moving apparatus capable of performing AF or OIS operation.

For example, in a dual camera module including an AF actuator and an OIS actuator, when the distance between the AF actuator and the OIS actuator is small, the cover member 300 made of the nonmagnetic material may be used to reduce magnetic field interference, whereby it is possible to inhibit abnormal AF or OIS operation.

Next, the bobbin 110 will be described.

Referring to FIGS. 3A and 3B, the bobbin 110 may be disposed inside the housing 140, and may be moved in the first direction (e.g. the Z-axis direction) due to electromagnetic interaction between the coil 120 and the magnet 130.

The lens (not shown) may be directly coupled to the inner surface 110a of the bobbin 110. However, the disclosure is not limited thereto. For example, the bobbin 110 may include a lens barrel (not shown), in which at least one lens is mounted. The lens barrel may be coupled inside the bobbin 110 in various manners.

The bobbin 110 may have an opening in which the lens or the lens barrel is mounted. The opening in the bobbin 110 may be a hole formed through the bobbin 110, and the shape of the opening of the bobbin 110 may coincide with the shape of the lens or the lens barrel mounted in the opening. For example, the shape of the opening may be circular, oval, or polygonal. However, the disclosure is not limited thereto.

The bobbin 110 may have at least one first upper protrusion 113, which is disposed on the upper surface thereof so as to be coupled and fixed to an inner frame 151 of the upper elastic member 150, and at least one first lower protrusion 117, which is disposed on the lower surface thereof so as to be coupled and fixed to an inner frame 161 of the lower elastic member 160.

The bobbin 110 may have an upper escape recess 112a, which is provided in a region of the upper surface thereof that corresponds to or is aligned with a first frame connection portion 153 of the upper elastic member 150. In addition, the bobbin 110 may have a lower escape recess 112b, which is provided in a region of the lower surface thereof that corresponds to or is aligned with a second frame connection portion 163 of the lower elastic member 160.

When the bobbin 110 is moved in the first direction, spatial interference between the first frame connection portion 153 and the bobbin 110 and between the second frame connection portion 163 and the bobbin 110 may be removed by the upper escape recess 112a and the lower escape recess 112b of the bobbin 110, whereby the first frame connection portion 153 and the second frame connection portion 163 may be easily elastically deformed.

The bobbin 110 may be provided in the outer surface 110b thereof with at least one recess 105, and the coil 120 may be disposed or settled in the recess 105 of the bobbin 110. For example, as shown in FIG. 3A, the recess 105 may have the shape of a ring rotated about the optical axis, however, the disclosure is not limited thereto.

The shape and number of recesses 105 may correspond to the shape and number of coils disposed around the outer surface 110b of the bobbin 110. In another embodiment, the bobbin 110 may have no recess for coil settlement.

The outer surface 110b of the bobbin 110 may include a first side surface 110b-1 corresponding to a first side portion 141 of the housing 140 and a second side surface 110b-2 corresponding to a second side portion 142 of the housing 140.

Next, the coil 120 will be described.

The coil 120 is disposed around the outer surface 110b of the bobbin 110, and electromagnetically interacts with the magnet 130, which is disposed in the housing 140.

In order to generate electromagnetic force due to electromagnetic interaction with the magnet 130, a driving signal may be applied to the coil 120. At this time, the driving signal may be a direct-current signal, or may have a voltage or current form.

An AF operation unit, which is elastically supported by the upper elastic member 150 and the lower elastic member 160, may be moved in the first direction by electromagnetic force due to electromagnetic interaction between the coil 120 and the magnet 130. The electromagnetic force may be adjusted to control movement of the bobbin 110 in the first direction, whereby an autofocus function may be performed.

The AF operation unit may include the bobbin 110, which is elastically supported by the upper elastic member 150 and the lower elastic member 160, and components mounted to the bobbin 110 so as to be movable together with the bobbin 110. For example, the AF operation unit may include the bobbin 110 and the coil 120. In addition, for example, the AF operation unit may further include the lens (not shown) mounted to the bobbin.

Referring to FIG. 3B, the coil 120 may be wound so as to wrap the outer surface 110b of the bobbin 110 in order to be rotated about the optical axis in the clockwise direction or in the counterclockwise direction.

For example, the coil 120 may be disposed or wound in the recess 105 provided in the outer surface 110b of the bobbin 110.

For example, the coil 120 may have the shape of a ring that wraps the outer surface 110b of the bobbin 110 about the optical axis in the clockwise direction or in the counterclockwise direction. In FIG. 3A, the coil 120 may have the shape of a single ring, however, the disclosure is not limited thereto. Two or more coil rings may be included.

In another embodiment, the coil 120 may be realized as a coil ring wound about an axis perpendicular to the optical axis in the clockwise direction or in the counterclockwise direction. The number of coil rings may be equal to the number of magnets 130, however, the disclosure is not limited thereto.

The coil 120 may be connected to at least one of the upper elastic member 150 or the lower elastic member 160. For example, the coil 120 may be connected to lower springs 160a and 160b, and a driving signal may be applied to the coil 120 through the lower springs 160a and 160b.

Next, the housing 140 will be described.

Referring to FIGS. 4A to 4C, the housing 140 supports the magnet 130, and receives the bobbin 110 therein such that the AF operation unit, for example, the bobbin 110 is movable in the first direction.

The housing 140 may generally have a pillar shape including an opening, and the opening of the housing 140 may be a hole formed through the housing 140. The housing 140 may include a plurality of side portions 141 and 142 that define the opening.

For example, the housing 140 may have a plurality of side portions 141 and 142 that define a polygonal (e.g. quadrangular or octagonal) or circular opening. The upper surfaces of the side portions 141 and 142 may define the upper surface of the housing 140.

For example, the housing 140 may include first side portions 141 spaced apart from each other and second side portions 142 spaced apart from each other. Each of the second side portions 142 may be disposed between two adjacent first side portions.

For example, the length of each of the first side portions 141 of the housing 140 may be longer than the length of each of the second side portions 142. For example, the first side portions 141 of the housing 140 may be portions corresponding to the sides of the housing 140, and the second side portions 142 of the housing 140 may be portions corresponding to the corners of the housing 140. For example, the first side portions 141 of the housing 140 may be referred to as "side portions," and the second side portions 142 of the housing 140 may be referred to as "corners."

The magnet 130 may be disposed or mounted at each of the first side portions 141 of the housing 140. For example, a recess 141a, in which the magnet 130 is settled, disposed, or fixed, may be provided in each of the first side portions 141 of the housing 140. In FIG. 4A, the recesses 141a are formed through the first side portions 141 of the housing 140, however, the disclosure is not limited thereto. The recesses may be concave recesses.

The housing 140 may have adhesive injection recesses 16, which are provided in the first side portions 141, in which the magnets are disposed, and which are located adjacent to the recesses 141a. Adhesive for adhering the magnets 150 to the recesses 141a may be injected through the adhesive injection recesses 16.

In addition, the housing 140 may have stoppers 24a and 24b disposed adjacent to the recesses 141a in order to support a first magnet 130-1 and a second magnet 130-2 inserted into the recesses 141a. The stoppers 24a and 24b may protrude from facing inner surfaces of the recesses 141a. The stoppers 24a and 24b may have shapes corresponding or equivalent to a first recess 10a and a second recess 10b of the first and second magnets 130-1 and 130-2, a description of which will follow.

In addition, a stair portion 29 forming a stair with the upper surface of the housing 140 in the optical-axis direction may be provided at each of the corners 142 of the housing 140. The stair portion 29 may be provided on the upper surface of each of the corners of the housing 140. The stair portion is a portion that corresponds to an injection gate for injection molding, and is provided in order to exclude spatial interference between the component disposed in the housing 140 (e.g. the upper elastic member 150) and burrs generated as the result of injection molding.

The housing 140 may have a first stopper 143, which protrudes from the upper portion or the upper surface thereof.

The first stopper 143 of the housing 140 inhibits collision between the cover member 130 and the housing 140. When external impact occurs, it is possible to inhibit the upper surface of the housing 140 from directly colliding with the inner surface of the upper portion of the cover member 300.

In addition, a second upper protrusion 144, to which an outer frame 152 of the upper elastic member 150 is coupled, may be provided on the upper portion or the upper surface of the housing 140. For example, the second upper protrusion 144 may be disposed on the upper surface of each of the second side portions 142 of the housing 140, however, the disclosure is not limited thereto. In another embodiment, the second upper protrusion may be disposed on the upper surface of each of the first side portions 141 of the housing 140.

The housing 140 may be provided on the lower portion or the lower surface thereof with a second lower protrusion 147, to which an outer frame 162 of the lower elastic member 160 is coupled. For example, the second lower protrusion 147 may be disposed on the lower portion or the lower surface of at least one of the first side portions 141 or the second side portions 142 of the housing 140.

In addition, a guide recess 148, into which a guide member 216 of the base 210 is inserted, fastened, or coupled, may be provided in the lower portion or the lower surface of each of the second side portions 142 of the housing 140. For example, the guide recess 148 of the housing 140 and the guide member 216 of the base 210 may be coupled to each other via an adhesive member (not shown) or a damper (not shown), and the housing 140 may be coupled to the base 210.

The housing 140 may be provided on the upper portion or the upper surface thereof with at least one protrusion 15a and 15b, to which the yoke unit 190 is coupled. For example, the at least one protrusion 15a and 15b may be disposed on the upper portion or the upper surface of the housing 140 in which the magnets 130 are disposed.

For example, the at least one protrusion 15a and 15b may be disposed on the upper portions or the upper surfaces of two facing first side portions of the housing 140 in which the magnets 130 are disposed. For example, the two protrusions 15a and 15b may be disposed on two facing first side portions of the housing 140 so as to be spaced apart from each other, however, the number of protrusions is not limited thereto.

The housing 140 may be provided on the upper portion or the upper surface thereof with yoke settlement portions 18a and 18b, in which the yoke unit 190 is disposed. The yoke settlement portions 18a and 18b may be provided on the upper portions or the upper surfaces of the first side portions 141 of the housing 140, in which the magnets 130 are disposed. The shape of the yoke settlement portions 18a and 18b may correspond to or coincide with the shape of the yoke unit 190.

For example, each of the yoke settlement portions 18a and 18b may include a protrusion that protrudes inwards from outside the housing 140 with respect to the inner surface of a corresponding one of the first side portions 141 of the housing.

The at least one protrusion 15a and 15b may be disposed in the yoke settlement portion 18a and 18b.

Next, the magnet 130 will be described.

Referring to FIGS. 4B and 4C, the magnet 130 may be disposed at each of the first side portions 141 of the housing 140. For example, the magnets 130-1 and 130-2 may be disposed at two facing first side portions 141 of the housing 140.

For example, the magnet 130 may include a first magnet 130-1 disposed at one of the two facing first side portions of the housing 140 and a second magnet 130-2 disposed at the other of the two facing first side portions of the housing 140. In an embodiment, magnets may be disposed at the second side portions of the housing 140. For example, magnets may be disposed at two facing second side portions of the housing 140.

At an initial position of the bobbin 110, the magnet 130 disposed at the housing 140 may overlap at least a portion of the coil 120 in a direction perpendicular to the optical axis. Here, the initial position of the bobbin 110 may be the original position of the AF operation unit in the state in which no electric power is applied to the coil 120 or the position at which the AF operation unit is located as the result of the upper elastic member 150 and the lower elastic member 160 being elastically deformed due only to the weight of the AF operation unit.

In addition, the initial position of the bobbin 110 may be the position at which the AF operation unit is located when gravity acts in the direction from the bobbin 110 to the base 210 or when gravity acts in the direction from the base 210 to the bobbin 110.

For example, the magnet 130 may be disposed in the recess 141a of each of the first side portions 141 of the housing 140 so as to overlap the coil 120 in the second direction or the third direction.

In another embodiment, no recess 141a or hole may be formed in each of the first side portions 141 of the housing 140, or the magnet 130 may be disposed in one of the outer surface and the inner surface of each of the first side portions 141 of the housing 140.

Disposition of the magnet 130 at each of the first side portions of the housing 140 will be described below.

The shape of the magnet 130 may have a shape corresponding to each of the first side portions 141 of the housing 140, for example, a rectangular parallelepiped shape, however, the disclosure is not limited thereto.

The magnet 130 may be a monopolar magnetized magnet disposed such that a first surface thereof facing the coil 120 has an S pole and a second surface opposite the first surface has an N pole.

In addition, for example, the magnet 130 may be a bipolar magnetized magnet divided into two parts in the optical-axis direction or a direction perpendicular to the optical axis. At this time, the magnet 130 may be realized by a ferrite, alnico, or rare-earth magnet.

The magnet 130 having a bipolar magnetized structure may include a first magnet portion including an N pole and an S pole, a second magnet portion including an N pole and an S pole, and a nonmagnetic partition.

The first magnet portion and the second magnet portion may be spaced apart from each other, and each of the first magnet portion and the second magnet portion may include an N pole, an S pole, and an interface between the N pole and the S pole. Here, the interface of each of the first and second magnet portions may be a portion having substantially no magnetism, may include a section having little polarity, and may be a portion that is naturally generated in order to form a magnet constituted by a single N pole and a single S pole.

The nonmagnetic partition may be located between the first magnet portion and the second magnet portion, and may separate or isolate the first magnet portion and the second magnet portion from each other. The nonmagnetic partition may be a portion having substantially no magnetism, may include a section having little polarity, and may be filled with air or may be made of a nonmagnetic material. The nonmagnetic partition may be expressed as a "neutral zone."

The number of magnets 130 may be plural. For example, the magnet 130 may include a first magnet 130-1 and a second magnet 130-2.

In an embodiment, the number of magnets 130 is two in order to reduce magnetic field interference with an adjacent camera module or lens moving apparatus, however, the disclosure is not limited thereto.

In another embodiment, the number of magnets 130 may be at least two. The surface of each of the magnets 130 that face the coil 120 may be planar, however, the disclosure is not limited thereto. The surface of each magnet may be curved.

Next, the upper elastic member 150 and the lower elastic member 160 will be described.

Referring to FIGS. 5 and 6, the upper elastic member 150 and the lower elastic member 160 are coupled to the bobbin 110 and to the housing 140, and flexibly support the bobbin 110.

For example, the upper elastic member 150 may be coupled to the upper portion, the upper surface, or the upper end of the bobbin 110 and to the upper portion, the upper surface, or the upper end of the housing 140, and the lower elastic member 160 may be coupled to the lower portion, the lower surface, or the lower end of the bobbin 110 and to the lower portion, the lower surface, or the lower end of the housing 140.

The upper elastic member 150 shown in FIG. 5 is constituted by an upper spring having a single structure, however, the disclosure is not limited thereto. In another embodiment, the upper elastic member may include a plurality of upper springs that are spaced apart or separated from each other.

Each of the upper elastic member 150 and the lower elastic member 160 may be realized as a leaf spring, however, the disclosure is not limited thereto. Each of the upper elastic member and the lower elastic member may be realized as a coil spring or a suspension wire.

The upper elastic member 150 may include a first inner frame 151 coupled to the first upper protrusion 113 of the bobbin 110, a first outer frame 152 coupled to the second upper protrusion 144 of the housing 140, and a first frame connection portion 153 for connecting the first inner frame 151 and the first outer frame 152 to each other.

In FIG. 5, the upper elastic member 150 is realized as a single upper spring, however, the disclosure is not limited thereto. In another embodiment, the upper elastic member 150 may include two or more upper springs.

For example, a through hole 151a or recess, which is coupled to the first upper protrusion 113 of the bobbin 110, may be provided in the first inner frame 151 of the upper elastic member 150, and a through hole 152a or recess, which is coupled to the upper protrusion 144 of the housing 140, may be provided in the first outer frame 152.

In addition, at least one through hole 25a or 25b or recess, which is coupled to the at least pone protrusion 15a and 15b, may be provided in the first outer frame 152 of the upper elastic member 150.

The lower elastic member 160 may include first and second lower springs 160a and 160b that are spaced apart from each other. The first and second lower springs 160a and 160b may be separated from each other.

Each of the first and second lower springs 160a and 160b may include a second inner frame 161 coupled to the first lower protrusion 114 of the bobbin 110, a second outer frame 162 coupled to the second lower protrusion 147 of the housing 140, and a second frame connection portion 163 for connecting the second inner frame 161 and the second outer frame 162 to each other.

For example, a through hole 161a or recess, which is coupled to the first lower protrusion 114 of the bobbin 110, may be provided in the second inner frame 161 of each of the first and second lower springs 160a and 160b, and a through hole 162a or recess, which is coupled to the second lower protrusion 147 of the housing 140, may be provided in the second outer frame 162.

For example, the first upper protrusion 113 of the bobbin 110 and the through hole 151a of the first inner frame, the first lower protrusion 117 of the bobbin 110 and the through hole 161a of the second inner frame, the second upper protrusion 144 of the housing 140 and the through hole 161a of the first outer frame, the second lower protrusion 147 of the housing 140 and the through hole 162a of the second outer frame, and the protrusions 15a and 15b of the housing 140 and the through holes 25a and 25b of the first outer frame may be adhered to each other by an adhesive member or thermal fusion.

Each of the first and second frame connection portions 153 and 163 may be formed so as to be bent or curved (or crooked) at least once in order to form a predetermined pattern. The upward and/or downward movement of the bobbin 110 in the first direction may be flexibly (or elastically) supported through positional change and minute deformation of the first and second frame connection portions 153 and 163.

The coil 120 may be coupled to the second inner frames 161 of the first and second lower springs 160a and 160b, and may be connected to the first and second lower springs 160a and 160b.

Referring to FIG. 7A, a first bonding portion 19a, to which one end of the coil 120 is bonded, may be provided at the upper surface of one end of the second inner frame 161 of the first lower spring 160a, and a second bonding portion 19b, to which the other end of the coil 120 is bonded, may be provided at the upper surface of one end of the second inner frame 161 of the second lower spring 160b.

The coil 120 may be bonded to the first and second bonding portions 19a and 19b by a conductive adhesive member, such as solder. In the case of the first and second bonding portions 19a and 19b, the "bonding portions" may also be referred to as pad portions, terminals, connection terminals, solder portions, or electrode portions.

In order to inhibit an oscillation phenomenon when the bobbin 110 is moved, a damper may be disposed between the first frame connection portion 153 of the upper elastic member 150 and the upper surface of the bobbin 110. Alternatively, a damper (not shown) may also be disposed between the second frame connection portion 163 of the lower elastic member 160 and the lower surface of the bobbin 110.

Alternatively, a damper may be coated between the upper elastic member 150 and each of the bobbin 110 and the housing 140 or between the lower elastic member 160 and each of the bobbin 110 and the housing 140. For example, the damper may be gel-type silicon, however, the disclosure is not limited thereto.

Each of the first and second lower springs 160a and 160b may be disposed at the upper surface of the base 210.

Each of the first and second lower springs 160a and 160b may include first and second connection terminals 164a and 164b for connection with the outside. In the case of the first and second connection terminals 164a and 164b, the "connection terminals" may also be referred to as terminals, pad portions, bonding portions, solder portions, or electrode portions.

For example, each of the first and second connection terminals 164a and 164b may be connected to the outer surface of the second outer frame 162 of a corresponding one of the first and second lower springs 160a and 160b, and may be bent and extend toward the base 210.

The first and second connection terminals 164a and 164b of the first and second lower springs 160a and 160b may be disposed at a first outer surface of the base 210 so as to be spaced apart from each other, and may abut the first outer surface of the base 210.

For example, the first and second connection terminals 164a and 164b may be disposed at one of the outer surfaces of the base 210. In this case, soldering for connection with the outside is easily performed, however, the disclosure is not limited thereto. In another embodiment, the first and second connection terminals of the first and second lower springs may be disposed at two different outer surfaces of the base 210.

The base 210 may be coupled to the housing 140, and may define a space for receiving the bobbin 110 and the housing 140 together with the cover member 300. The base 210 may have an opening corresponding to the opening of the bobbin 110 and/or the opening of the housing 140. The base may have a shape coinciding with or corresponding to the shape of the cover member 300, for example, a quadrangular shape.

The base 210 may include a guide member 216 protruding upwards from each of the four corners thereof by a predetermined height.

For example, the guide member 216 may have a polygonal prismatic shape protruding from the upper surface of the base 210 so as to be perpendicular to the upper surface of the base 210, however, the disclosure is not limited thereto.

The guide member 216 may be inserted into the guide recess 148 of the housing 140, and may be fastened or coupled to the guide recess 148 by an adhesive member (not shown), such as epoxy or silicone.

First and second concave portions 205a and 205b, which correspond to the first and second connection terminals 164a and 164b of the first and second lower springs 160a and 160b, may be provided in the outer surface of the base 210.

For example, the first and second concave portions 205a and 205b may be disposed at the outer surface of one of the side portions of the base 210 so as to be spaced apart from each other.

For example, each of the first and second concave portions 205a and 205b may include an upper opening that is open to the upper surface of the base 210 and a lower opening that is open to the lower surface of the base 210.

For example, the inner surface of each of the first and second connection terminals 164a and 164b may abut one surface (e.g. the bottom surface) of a corresponding one of the first and second concave portions 205a and 205b.

The outer surface of each of the first and second connection terminals 164a and 164b, which are disposed in the first and second concave portions 205a and 205b, may be exposed from the outer surface of the base 210.

In addition, the lower end of each of the first and second connection terminals 164a and 164b may be exposed from the lower surface of the base 210, however, the disclosure is not limited thereto. In another embodiment, the lower end of each of the first and second connection terminals may not be exposed from the lower surface of the base 210.

Each of the first and second connection terminals 164a and 164b may be connected to external wires or external elements by a conductive material, such as solder, in order to supply electric power or a signal from the outside.

In addition, stairs 211 may be provided at the lower end of the outer surface of the base 210, and the stairs 211 may contact the lower ends of the side plates of the cover member 300 and may guide the cover member 300. At this time, the stairs 211 of the base 210 and the lower ends of the side plates of the cover member 300 may be adhered, fixed, and sealed by an adhesive.

Each of the first and second connection terminals 164a and 164b of the first and second lower springs 160a and 160b shown in FIGS. 7A and 7B is integrally formed with the second inner frame 161, the second outer frame 162, and the second frame connection portion 163, however, the disclosure is not limited thereto.

In another embodiment, each of the first and second lower springs may include only the second inner frame 161, the second outer frame 162, and the second frame connection portion 163, and each of the first and second connection terminals may be separately disposed at the outer surface of the base 210. In this case, one end of each of the first and second connection terminals disposed at the outer surface of the base 210 may be coupled or bonded to the second outer frame of a corresponding one of the first and second lower springs by a conductive material, such as solder.

An embodiment may be an AF lens moving apparatus mounted in a dual camera module. The dual camera module is a camera module including two lens moving apparatuses. For example, the dual camera module may include a lens moving apparatus capable of performing only an autofocus function (hereinafter referred to as an "AF lens moving apparatus") and a lens moving apparatus capable of performing an autofocus function and an optical image stabilization (OIS) function (hereinafter referred to as an "OIS lens moving apparatus").

Figure 20:
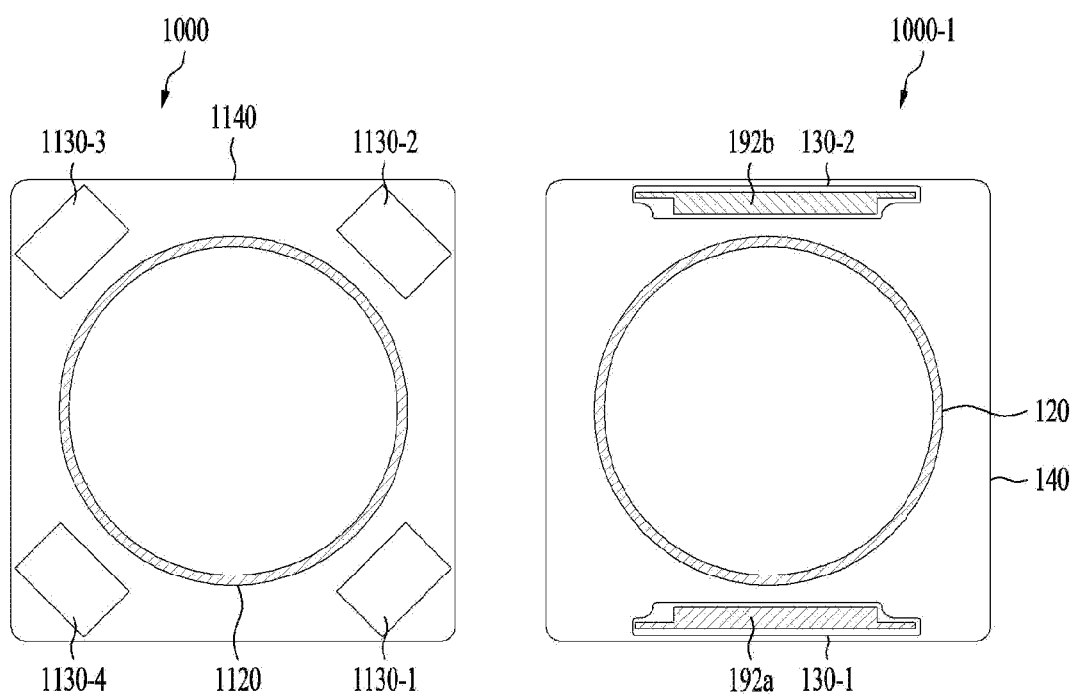
FIG. 20 is a conceptual view of the dual camera module shown in FIG. 19.

FIG. 19 shows an embodiment of the dual camera module, and FIG. 20 is a conceptual view of the dual camera module shown in FIG. 19.

Referring to FIGS. 19 and 20, the dual camera module may include an OIS camera module 1000 and an AF camera module 1000-1.

For example, the OIS camera module 1000 may include a bobbin 1100, a housing 1140, an AF coil 1120 mounted to the bobbin 1100, a magnet 1130 mounted to the housing 1140, an upper spring 1150 and a lower spring 1160 coupled to the bobbin 1110 and the housing 1140, sensing magnets 180 and 185 mounted to the bobbin 1110, a support member 1220 connected between the upper spring 1150 and a circuit board 1250, an OIS coil 1230 disposed under the lower elastic member 1160 so as to correspond to the magnet 1130, a circuit board 1250 disposed under the OIS coil 1230 so as to be connected to the AF coil 1120, the OIS coil 1230, and a position sensor 1170, and a base 1210 disposed under the circuit board 1250.

In addition, the OIS camera module may further include sensing magnets 180 and 185 mounted to the bobbin 111 and a position sensor 1170 mounted to the housing 1140 to sense intensity of a magnetic field of each of the sensing magnets.

The housing 1140 includes side portions and corners located between two adjacent side portions. The magnet 1130 may be disposed at each of the corners (or the side portions), however, the disclosure is not limited thereto. In another embodiment, the magnet 1130 may be disposed at each of the side portions of the housing 1140.

The AF lens moving apparatus 1000-1 may include components corresponding to the components of the lens moving apparatus 100 according to the embodiment. For example, the AF lens moving apparatus 1000-1 may be the lens moving apparatus 100, and a detailed description thereof will be omitted.

In the dual camera module, the OIS lens moving apparatus 1000 and the AF lens camera module 1000-1 may be disposed so as to be spaced apart from each other, and may be disposed adjacent to each other. For example, the distance d11 therebetween may be small (e.g. d11=1 mm).

In addition, for example, the distance between a cover member of the OIS lens moving apparatus 1000 and a cover member of the AF camera module 1000-1 may be less than 3 mm. In addition, for example, the distance between the cover member of the OIS lens moving apparatus 1000 and a cover member of the AF camera module 1000-1 may be less than 2 mm.

The OIS lens moving apparatus 1000 may perform handshake compensation through interaction between the OIS coil 1230 and the magnet 1230. To this end, the housing 1140 and the components coupled thereto may be moved in a direction perpendicular to the optical axis. By OIS operation for such handshake compensation, the distance between the magnet 1130 of the OIS lens moving apparatus 1000 and the magnet of the AF lens moving apparatus 1000-1 may be reduced, whereby magnetic field interference may occur between the magnet 1130 of the OIS lens moving apparatus 1000 and the magnet of the AF lens moving apparatus, and OIS operation of the OIS lens moving apparatus 1000 and AF operation of the AF lens moving apparatus 1000-1 may be abnormally performed due to such magnetic field interference.

In order to reduce the magnetic field interference, the cover member 300 of the lens moving apparatus 100 according to the embodiment may be made of a nonmagnetic material, such as SUS, aluminum (Al), copper (Cu), tin (Sn), or platinum.

In addition, for example, in order to reduce the magnetic field interference, the embodiment may not include four magnets but may include two magnets 130-1 and 130-2 disposed at the first side portions 141 of the housing 140 that do not face the OIS lens moving apparatus 1000.

In order to reduce the magnetic field interference, a first recess 10a (see FIG. 10A) may be provided in the first end (the first edge) of each of the magnets 130-1 and 130-2 according to the embodiment.

In addition, in order to balance electromagnetic force due to interaction with the coil 120, a second recess 10b (see FIG. 10A) may be provided in the second end (the second edge) of each of the magnets 130-1 and 130-2.

Figure 8:
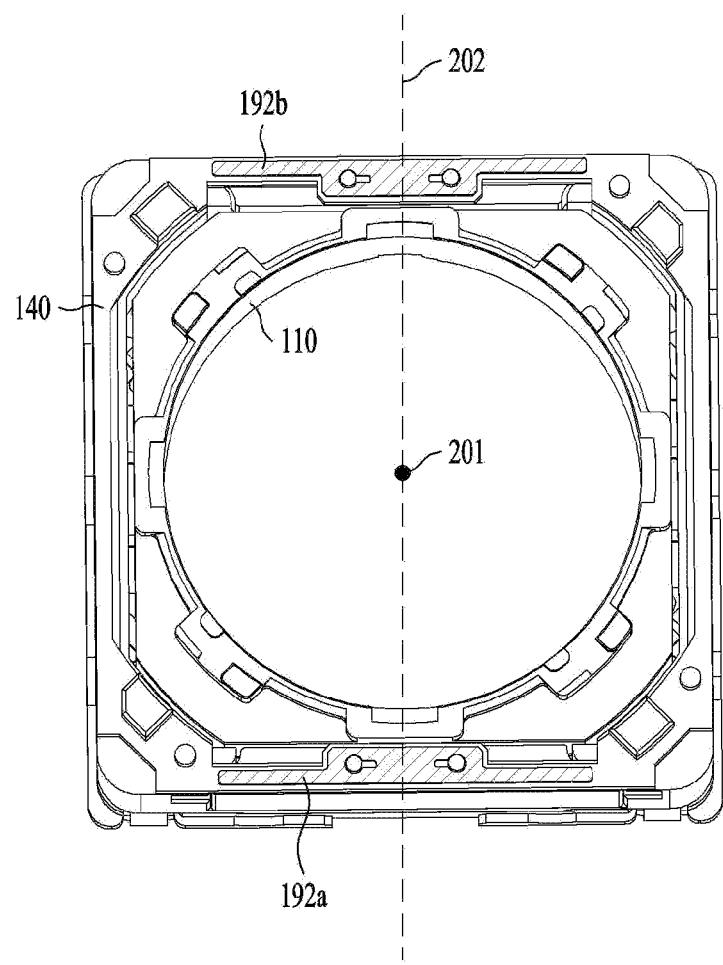
FIG. 8 shows the magnet and a yoke unit mounted to the housing.
Figure 9:
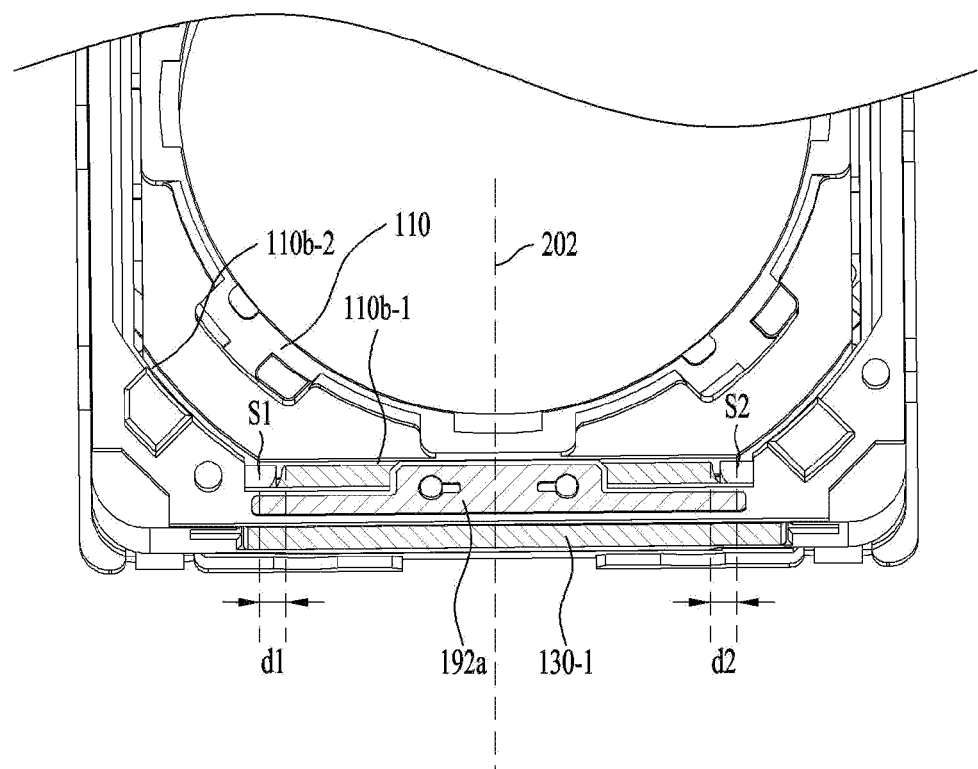
FIG. 9 shows an embodiment of the disposition of the housing, a first magnet, and a first yoke shown in FIG. 8.
Figure 10A:
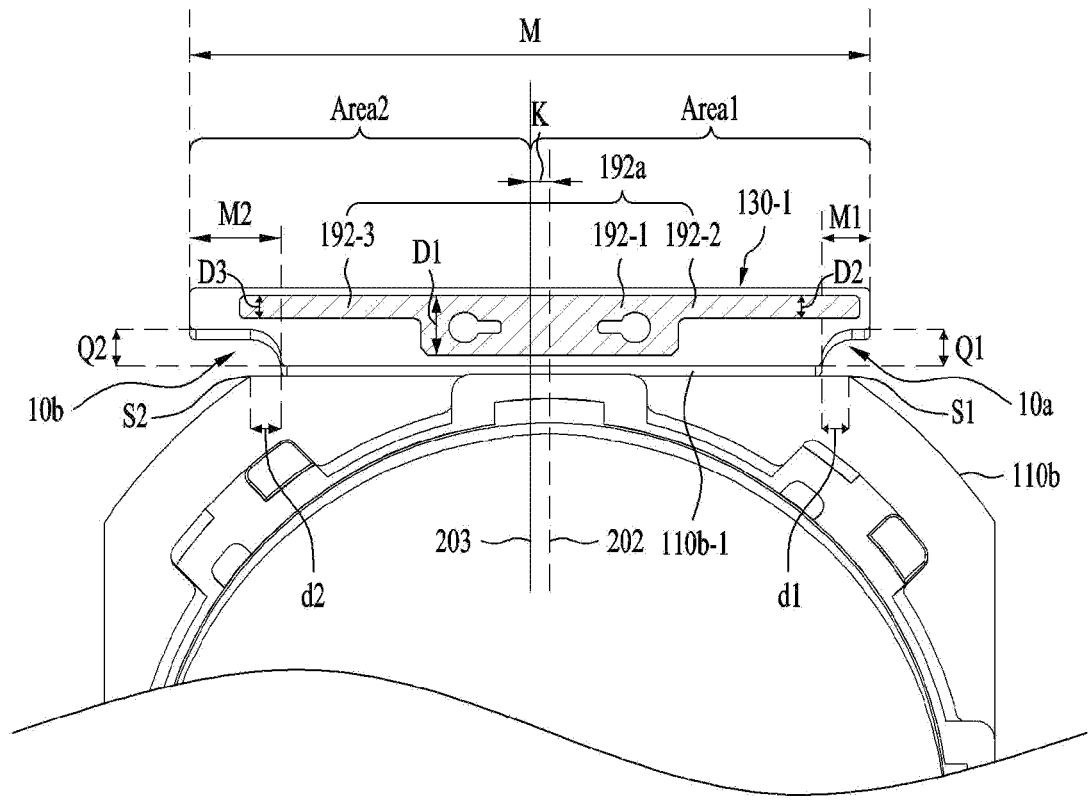
FIG. 10A shows disposition of the bobbin, the first magnet, and the first yoke shown in FIG. 9.
Figure 10B:
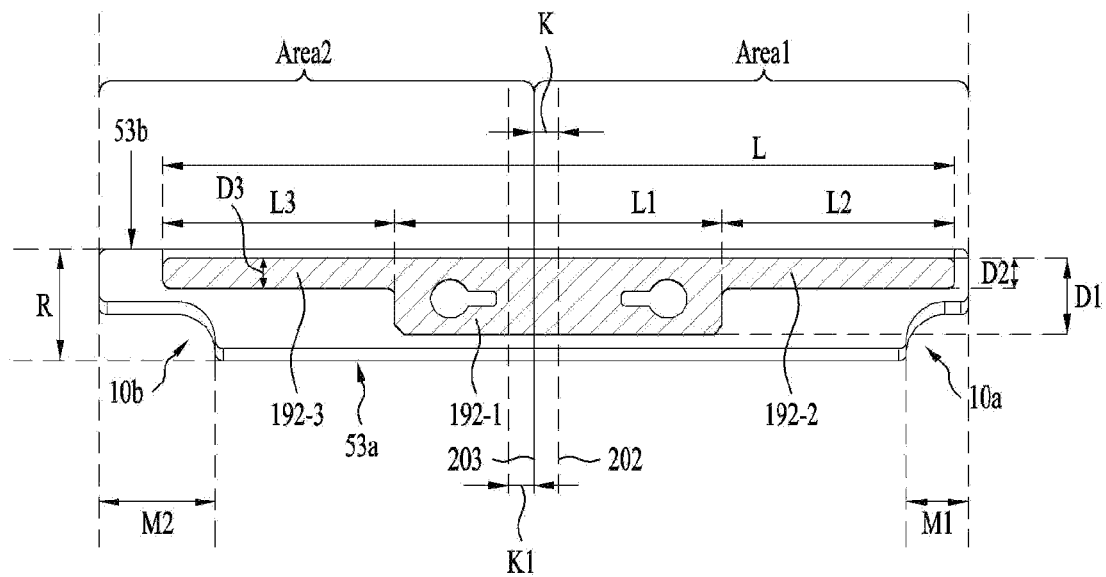
FIG. 10B is an enlarged view of the first magnet and the first yoke shown in FIG. 9.

FIG. 8 shows the magnet 130 and the yoke unit 190b mounted to the housing 140, FIG. 9 shows an embodiment of the disposition of the housing 140, the first magnet 130-1, and the first yoke 192a shown in FIG. 8, FIG. 10A shows disposition of the bobbin 110, the first magnet 130-1, and the first yoke 192a shown in FIG. 9, and FIG. 10B is an enlarged view of the first magnet 130-1 and the first yoke 192a shown in FIG. 9.

Referring to FIGS. 8 to 10B, the first magnet 130-1 may be disposed so as to be biased to one side with respect to a baseline 202. For example, the baseline 202 may be a straight line that is perpendicular to the outer surface of the first side portion 141 of the housing 140 at which the first magnet 130-1 is disposed and that passes through the center 201 of the housing 140. Alternatively, for example, the baseline 202 may be a straight line that is perpendicular to the outer surface of the side plate of the cover member 300 that corresponds to or is opposite the first magnet 130-1 and that passes through the center 201 of the housing 140.

In another embodiment, the baseline 202 may be a straight line that passes through the center of the bobbin 110 and that is perpendicular to the first side portion 141 of the housing at which each of the magnets 130-1 and 130-2 is disposed.

For example, the first magnet may be disposed so as to be biased to the side far away from the OIS lens moving apparatus 1000 of the dual camera module with respect to the baseline 202.

For example, the first magnet 130-1 may be disposed at the first side portion 141 of the housing 140 such that a center line 203 of the first magnet 130-1 is located at one side with respect to the baseline 202.

For example the center line 203 of the first magnet 130-1 may be a straight line that passes through the center of the first magnet 130-1 between the first end and the second end thereof and that is perpendicular to a first side surface 53*a* or a second side surface 53*b* of the first magnet 130-1.

For example, the center line 203 of the first magnet 130-1 may be a center line of a long side of the first magnet 130-1, however, the disclosure is not limited thereto. In another embodiment, the center line of the first magnet 130-1 may be a center line of a short side of the first magnet 130-1.

For example, the center line 203 of the first magnet 130-1 and the baseline 202 may be parallel to each other. Alternatively, the center line 203 of the first magnet 130-1 may be perpendicular to the first side surface 53*a* of the first magnet 130-1.

The distance K by which the first magnet 130-1 is biased with respect to the baseline 202 or the distance K between the baseline 202 and the center line 203 may be greater than 0 and may be equal to or less than 0.5 mm ($0 < K \leq 0.5$ mm). Here, K may be a positive real number.

In addition, for example, K may be greater than 0 and may be equal to or less than 0.3 mm. In addition, for example, K may be 0.16 mm to 0.2 mm.

In the case in which K exceeds 0.5 mm, the area that the first magnet 130-1 overlaps a portion of the coil 120 disposed at the first side surface 110*b*-1 of the bobbin 110 may be reduced, whereby AF driving force may be reduced.

In another embodiment, however, K may be 0, which will be described with reference to FIG. 12.

As the first magnet 130-1 is disposed so as to be biased to the side far away from the OIS lens moving apparatus 1000 of the dual camera module with respect to the baseline 202, it is possible to reduce magnetic field interference, to inhibit abnormal AF operation, and to improve accuracy in AF operation.

Referring to FIG. 10A, the first magnet 130-1 may include a first area Area1 located at one side with respect to the center line 203 and a second area Area2 located at the other side with respect to the center line 203.

For example, in FIG. 10A, the OIS lens moving apparatus 1000 of the dual camera module may be located at the right side with respect to the lens moving apparatus 100.

That, the first area Area1 of the first magnet 130-1 may be an area that is further adjacent to the OIS lens moving apparatus 1000 of the dual camera module than the second area Area2.

A first recess 10*a* may be provided in the first area Area1 of the first magnet 130-1 in order to reduce the magnetic field interference. Since the volume or area of the first area Area1 of the first magnet 130-1 is reduced by the first recess 10*a*, it is possible to reduce magnetic field interference with the OIS lens moving apparatus 1000 of the dual camera module disposed adjacent to the first area Area1.

In order to restrain reduction in the intensity of electromagnetic force due to interaction between the first magnet 130-1 and the coil 120, the first recess 10*a* may be formed in the first area Area1 of the first magnet 130-1 within a range within which the range of overlap between the coil 120 and the first magnet 130-1 in a direction perpendicular to the optical axis is not reduced. The first recess 10*a* may be concave inwards with respect to a side surface of the first area Area1 of the first magnet 130-1.

For example, a chamfered first recess 10*a* (see FIG. 10A) may be provided in one corner located at the first end (the first edge) of the first magnet 130-1. At this time, the first end of the first magnet 130-1 may be an end of the first magnet 130-1 adjacent to the OIS lens moving apparatus of the dual camera module.

The horizontal length of the first side surface 53*a* (see FIG. 10B) of the first magnet 130-1 is shorter than the horizontal length of the second side surface 53*b* of the first magnet 130-1 due to the first recess 10*a*, but the horizontal length of the second side surface 53*b* of the first magnet 130-1 is not affected by the first recess 10*a*. Consequently, the range of overlap between the first magnet 130-1 and the coil 120 is not reduced by the first recess 10*a*, and reduction in electromagnetic force between the first magnet 130-1 and the coil 120 may be small or slight.

Here, the first side surface 53*a* of the first magnet 130-1 may be a surface that faces the first side surface of the bobbin 110 or the coil 120, and the second side surface 53*b* of the first magnet 130-1 may be a surface opposite the first side surface of the first magnet 130-1.

The horizontal direction of the first side surface 53*a* of the first magnet 130-1 and the horizontal direction of the second side surface 53*b* thereof may be a direction parallel to the direction from the first end to the second end of the first magnet 130-1.

In FIG. 10A, the first recess 10*a* is provided in a first corner, which is one of two corners of the first end of the first magnet 130-1 that is adjacent to the first side surface 110*b*-1 of the bobbin, however, the disclosure is not limited thereto. In another embodiment, the first recess may be provided in a second corner, which is one of the corners of the first end of the first magnet 130-1, or the first recess may be provided in each of the first corner and the second corner. Also, in another embodiment, the horizontal length of the second side surface of the first magnet 130-1 may be shorter than the horizontal length of the first side surface of the first magnet 130-1.

In order to balance the intensity of electromagnetic force between the coil 120 and the first magnet 130-1, a second recess 10*b* may be provided in the second area Area2 of the first magnet 130-1. The second recess 10*b* may be concave inwards with respect to a side surface of the second area Area2 of the first magnet 130-1.

The second recess 10*b* may be formed in the second area Area2 of the first magnet 130-1 within a range within which the range of overlap between the coil 120 and the first magnet 130-1 in a direction perpendicular to the optical axis is not reduced.

For example, a chamfered second recess 10*b* (see FIG. 10A) may be provided in one corner located at the second end of the first magnet 130-1. At this time, the second end of the first magnet 130-1 may be an end of the first magnet 130-1 located opposite to the first end of the first magnet 130-1.

For example, the second recess 10b may be located at the corner of the second area Area2 disposed relative to the corner of the first area Area1, in which the first recess 10a is formed, in a symmetrical fashion with respect to the center line 203.

For example, the first recess 10a may abut one end of the first side surface 53a of the first magnet 130-1, and the second recess 10b may abut the other end of the first side surface 53a of the first magnet 130-1.

For example, the first side surface 53a of the first magnet 130-1 may overlap a portion of the coil 120 disposed at the first side surface 110b-1 of the bobbin 110 in a direction from the first magnet 130-1 to the first side surface of the bobbin 110.

In addition, for example, each of the first recess 10a and the second recess 10b may overlap a portion of the coil 120 disposed at the first side surface 110b-1 of the bobbin 110 in a direction from the first magnet 130-1 to the first side surface of the bobbin 110.

Since the first magnet 130-1 is disposed so as to be biased to one side from the baseline 202, imbalance in electromagnetic force due to interaction with the coil 120 may occur with respect to the baseline 202. In order to overcome imbalance in electromagnetic force due to interaction with the coil 120 due to disposition of the first magnet 130-1, the sizes of the first recess 10a and the second recess 10b may be different from each other.

For example, the size of the second recess 10b may be greater than the size of the first recess 10a.

The horizontal length M2 of the second recess 10b and the horizontal length M1 of the first recess may be different from each other. For example, the horizontal length M2 of the second recess 10b may be greater than the horizontal length M1 of the first recess 10a (M2>M1).

For example, the difference M2−M1 between the horizontal length M2 of the second recess 10b and the horizontal length M1 of the first recess 10a may be a positive integer multiple of the distance K by which the center line 203 of the first magnet 130-1 is moved.

For example, the difference M2−M1 between the horizontal length M2 of the second recess 10b and the horizontal length M1 of the first recess 10a may be the distance K by which the center line 203 of the first magnet 130-1 is moved (e.g. M2−M1=K).

In addition, for example, the vertical length Q2 of the second recess 10b may be equal to the vertical length Q1 of the first recess 10a (Q2=Q1), however, the disclosure is not limited thereto. In another embodiment, the vertical length Q2 of the second recess 10b may be greater than the vertical length Q1 of the first recess 10a (Q2>Q1).

The vertical direction of the first recess 10a may be a direction perpendicular to the horizontal direction of the first recess 10a, and the vertical direction of the second recess 10b may be a direction perpendicular to the horizontal direction of the second recess 10b.

For example, the vertical length Q1 of the first recess 10a and the vertical length Q2 of the second recess 10b may be less than or equal to ½ of the vertical length R (see FIG. 10B) of the first magnet 130-1 (Q1, Q2≤R/2). The reason for this is that, in the case in which Q1>R/2 and Q2>R/2, it is not possible to sufficiently obtain electromagnetic force due to interaction between the coil 120 and the first magnet 130-1 by a predetermined magnitude for AF operation.

A first distance d1 may be equal to a second distance d2. The first distance d1 may be the distance between a corner at which the first side surface 53a of the first magnet 130-1 and the first recess 10a join and a first corner S1 of the bobbin 110 in a direction parallel to the horizontal direction of the first magnet 130-1.

The second distance d2 may be the distance between a corner at which the first side surface 53a of the first magnet 130-1 and the second recess 10b join and a second corner S2 of the bobbin 110 in a direction parallel to the horizontal direction of the first magnet 130-1.

S1 may be a corner at which the first side surface 110b-1 of the bobbin 110 corresponding to or opposite the first side portion of the housing at which the first magnet 130-1 is disposed or the first side surface 53a of the first magnet 130-1 and a second side surface 110b-2 of the bobbin 110 adjacent thereto join.

S2 may be a corner at which the first side surface 110b-1 of the bobbin 110 and another second side surface 110b-2 of the bobbin 110 adjacent thereto join.

Since d1=d2, imbalance in the intensity of electromagnetic force due to interaction between the first magnet 130-1 and the coil 120 may be alleviated with respect to the baseline 202.

The first end of the first magnet 130-1 may protrude from the center of the first magnet 130-1 toward the first end of the first magnet 130-1 with respect to the first corner 51 of the bobbin 110.

The second end of the first magnet 130-1 may protrude from the center of the first magnet 130-1 toward the second end of the first magnet 130-1 with respect to the second corner S2 of the bobbin 110.

For example, the protruding length of the second end of the first magnet 130-1 may be greater than the protruding length of the first end of the first magnet 130-1.

In FIG. 10A, a corner at which the first side surface 53a of the first magnet 130-1 and the first recess 10a join in a direction from the first magnet 130-1 to the first side surface 53a of the bobbin 110 corresponds to or overlaps the first side surface 110b-1 of the bobbin 110, and a corner at which the first side surface 53a of the first magnet 130-1 and the second recess 10b join corresponds to or overlaps the first side surface 110b-1 of the bobbin 110, however, the disclosure is not limited thereto.

In another embodiment, a corner at which the first side surface 53a of the first magnet 130-1 and the first recess 10a join may correspond to or may be aligned with the first corner 51 of the bobbin 110, and a corner at which the first side surface 53a of the first magnet 130-1 and the second recess 10b join may correspond to or may be aligned with the second corner S2 of the bobbin 110.

The first yoke 192a may be disposed on the upper surface of the upper elastic member 150 disposed at the housing 140 so as to overlap the first magnet 130-1 in the optical-axis direction.

In addition, the second yoke 192b may be disposed on the upper surface of the upper elastic member 150 disposed at the housing 140 so as to overlap the second magnet 130-2 in the optical-axis direction.

The first yoke 192a may increase the intensity of electromagnetic force due to interaction between the coil 120 and the first magnet 130-1. In addition, the second yoke 192b may increase the intensity of electromagnetic force due to interaction between the coil 120 and the second magnet 130-2.

For example, electromagnetic force (e.g. 0.162 N) when the yoke unit 190 is provided may be about 6.5% higher than electromagnetic force (e.g. 0.152 N) when no yoke unit 190 is provided.

The first yoke 192a may include a body 192-1, a first extension portion 192-2 connected to the body 192-1 and extending to one side of the body 192-1, and a second extension portion 192-3 connected to the body 192-1 and extending to the other side of the body 192-1.

For example, the first extension portion 192-2 may extend from the center line 203 of the first magnet 130-1 toward the first end of the first magnet 130-1, and the second extension portion 192-3 may extend from the center line 203 of the first magnet 130-1 toward the second end of the first magnet 130-1.

The first magnet 130-1 according to the embodiment may have a T shape due to the first recess 10a and the second recess 10b. In addition, the first yoke 192a located on the first magnet 130-1 may also have a T shape, however, the disclosure is not limited thereto.

As shown in FIGS. 10A and 10B, the center line of the first yoke 192A may be located within a range from 0 to K toward the center line 203 of the first magnet 130-2 with respect to the baseline 202.

For example, the center line of the first yoke 192A may be located within a range from 0 to 0.5 mm toward the center line 203 of the first magnet 130-1 from the baseline 202 with respect to the baseline 202.

The center line of the first yoke 192a may be a straight line that passes through the center of the first yoke 192a and that is parallel to the baseline 202 or the center line 203 of the first magnet 130-1. Here, K may be a distance that the first magnet 130-1 is biased with respect to the baseline 202, as described with reference to FIG. 10A.

For example, the center line of the first yoke 192a may be aligned with the baseline 202.

The first yoke 192a may be disposed in a symmetrical fashion with respect to the baseline 202. This is disposition considering the center of gravity of the first yoke 192a. In addition, as shown in FIGS. 10A and 10B, the first yoke 192a may be disposed in an asymmetrical fashion with respect to the center line 203.

The body 192-1 of the first yoke 192a may overlap the first area Area1 and the second area Area2 of the first magnet 130-1 in the optical-axis direction, the first extension portion 192-2 of the first yoke 192a may overlap the first area Area1 of the first magnet 130-1 in the optical-axis direction, and the second extension portion 192-3 of the first yoke 192a may overlap the second area Area2 of the first magnet 130-1 in the optical-axis direction.

The horizontal length L of the first yoke 192a may be smaller than the horizontal length M of the first magnet 130-1 (L<M), however, the disclosure is not limited thereto. In another embodiment, L=M.

For example, each of the first extension portion 192-2 and the second extension portion 192-3 may be located so as to be closer to the second side surface 53b of the first magnet 130-1 than to the first side surface 53a of the first magnet 130-1. For example, the distance between each of the first extension portion 192-2 and the second extension portion 192-3 and the second side surface 53b may be shorter than the distance between each of the first extension portion 192-2 and the second extension portion 192-3 and the first side surface 53a.

The horizontal length L2 of the first extension portion 192-2 may be smaller than the horizontal length L1 of the body 192-1 of the first yoke 192a (L2<L1). The horizontal length L3 of the second extension portion 192-3 may be smaller than the horizontal length L1 of the body 192-1 of the first yoke 192a (L3<L1). This serves to inhibit reduction in the intensity of electromagnetic force due to interaction between the coil 120 and the first magnet 130-1.

For example, the horizontal length L2 of the first extension portion 192-2 and the horizontal length L3 of the second extension portion 192-3 may be equal to each other, however, the disclosure is not limited thereto.

In another embodiment, L2 and L2 may be different from each other. For example, the horizontal length L3 of the second extension portion 192-3 may be shorter than the horizontal length L2 of the first extension portion 192-2. This serves to alleviate imbalance in the intensity of electromagnetic force due to biased disposition of the first magnet 130-1.

For example, the ratio L2/L3 of the horizontal length L2 of the first extension portion 192-2 to the horizontal length L3 of the second extension portion 192-3 may be a positive integer multiple of the ratio M1/M2 of the horizontal length M1 of the first recess 10a to the horizontal length M2 of the second recess 10b. For example, L2/L3=M1/M2.

The first extension portion 192-2 may protrude toward the first end of the first magnet 130-1 with respect to a corner at which the first recess 10a and the first side surface 53a of the first magnet 130-1 join. In addition, the second extension portion 192-3 may protrude toward the second end of the first magnet 130-1 with respect to a corner at which the second recess 10b and the first side surface 53a of the first magnet 130-1 join.

The vertical length D1 of the body 192-1 of the first yoke 192a may be smaller than the vertical length R of the first magnet 130-1, however, the disclosure is not limited thereto. In another embodiment, D1=R.

The thickness of the first yoke 192a may be 0.01 to 3 mm, however, the disclosure is not limited thereto. For example, the thickness of the first yoke 192a may be 0.01 to 1 mm.

In the case in which the thickness of the first yoke 192a is less than 0.01 mm, the effect of increasing electromagnetic force due to interaction between the magnet 130 and the coil 120 may be slight. In the case in which the thickness of the first yoke 192a exceeds 3 mm, the weight of the first yoke 192a may be increased, whereby the total weight of the lens moving apparatus 100 may be greatly increased.

The vertical length D2 of the first extension portion 192-2 may be smaller than the vertical length D1 of the body 192-1 (D2<D1), and the vertical length D3 of the second extension portion 192-3 may be smaller than the vertical length D1 of the body 192-1 (D3<D1).

For example, each of D2 and D3 may be less than or equal to ½ of the vertical length D1 of the body 192-1 (D2, D3≤D1/2), however, the disclosure is not limited thereto.

For example, the horizontal length L of the first yoke 192 may be 80% to 95% of the horizontal length M of the second side surface 53b of the first magnet 130-1, however, the disclosure is not limited thereto. In the case in which L is less than 80% of M, electromagnetic force due to interaction between the first magnet 130-1 and the coil 120 may be reduced. In the case in which L exceeds 95% of M, the effect of magnetic field interference may be increased.

In addition, for example, the vertical length D2 of the first extension portion 192-2 of the first yoke 192a and the vertical length D3 of the second extension portion 192-3 thereof may be 10% to 50% of the vertical length R of the first magnet 130-1, however, the disclosure is not limited thereto.

In the case in which D2 and D3 are less than 10% of R, electromagnetic force due to interaction between the first magnet 130-1 and the coil 120 may be reduced. In the case in which D2 and D3 exceed 50% of R, the effect of magnetic field interference may be increased.

Each of the first yoke 192a and the second yoke 192b may be made of a magnetic material. In the case in which the sizes of the first extension portion and the second extension portion are large, therefore, magnetic field interference with the OIS lens moving apparatus 1000 may be increased. In an embodiment, therefore, D2 and D3 are smaller than D1 in order to reduce magnetic field interference.

The first extension portion 192-2 may not overlap the first recess 10a in the optical-axis direction, and the second extension portion 192-3 may not overlap the second recess 10b in the optical-axis direction. This serves to increase the intensity of electromagnetic force due to interaction between the coil 120 the first magnet 130-1 caused by the first yoke 192a.

The body 192-1 of the first yoke 192a may be provided with at least one through hole 21a and 21b configured to be coupled to the at least one protrusion 15a and 15b of the housing 140, and an incision portion 22, into which an adhesive member permeates, may be formed in the at least one through hole 21a and 21b. The at least one protrusion 15a and 15b of the housing 140 may be coupled to the through holes 25a and 25b of the upper elastic member 150 and to the through holes 21a and 21b of the first yoke 192a, and the protrusions 15a and 15b of the housing 140, the through holes 25a and 25b of the upper elastic member 150, and the through holes 21a and 21b of the first yoke 192a may be coupled to each other by the adhesive member.

In FIGS. 9 to 10B, the description of the disposition and sizes of the first magnet 130-1 and the first yoke 192a may be equally applied to the first magnet 130-2 and the second yoke 192b.

Figure 11A:
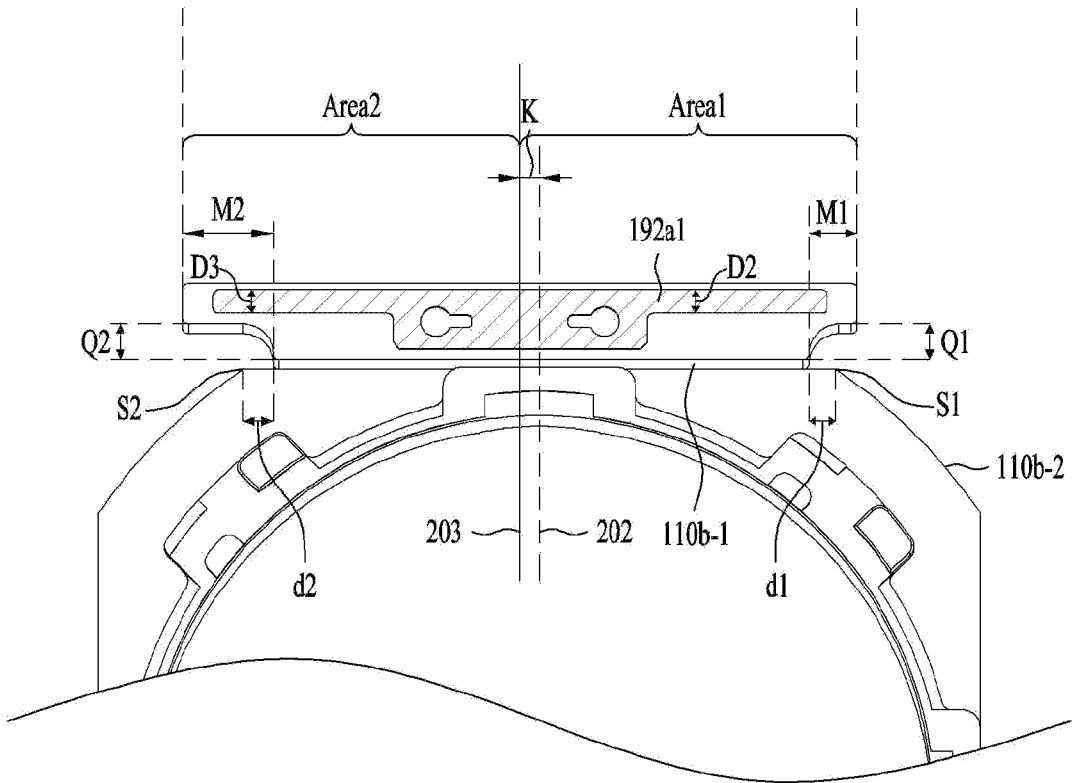
FIG. 11A shows disposition of a first yoke according to another embodiment.
Figure 11B:
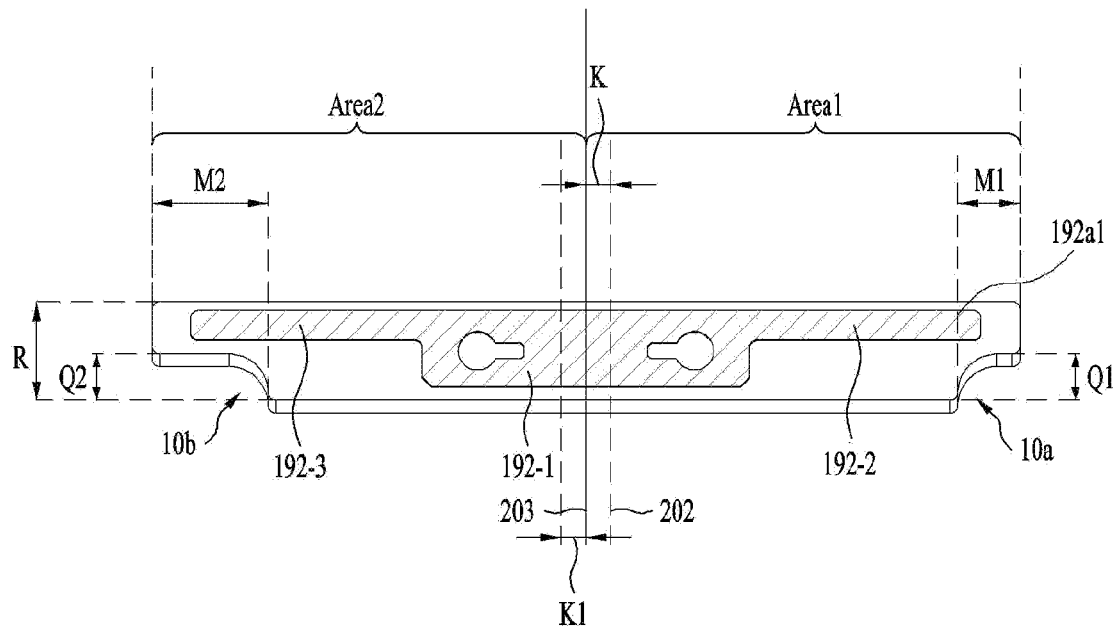
FIG. 11B is an enlarged view of the first magnet and the first yoke shown in FIG. 11A.

FIG. 11A shows disposition of a first yoke 192a1 according to another embodiment, and FIG. 11B is an enlarged view of the first magnet 130-1 and the first yoke 192a1 shown in FIG. 11A.

Referring to FIGS. 11A and 11B, the first yoke 192a1 may be disposed in a symmetrical fashion with respect to the center line 203 of the first magnet 130-1.

For example, the body of the first yoke 192a1 may be in a symmetrical fashion with respect to the center line 203 of the first magnet 130-1, and the first extension portion and the second extension portion of the first yoke 192a1 may be in a symmetrical fashion with respect to the center line 203 of the first magnet 130-1.

In addition, the first yoke 192a1 may be in an asymmetrical fashion with respect to the baseline 202.

In the embodiment of FIGS. 11A and 11B, the first yoke 192a according to the embodiment of FIGS. 10A and 10B is moved by the distance K that the first magnet 130-1 is moved in the direction in which the center line 203 of the first magnet 130-1 is moved with respect to the baseline 202.

For example, the center line of the first yoke 192a1 may be aligned with the center line 203 of the first magnet 130-1.

Since the first yoke 192a1 is disposed in a symmetrical fashion with respect to the center line 203 of the first magnet 130-1, it is possible to obtain the effect of increasing the intensity of electromagnetic force between the coil 120 and the first magnet 130-1 due to the first yoke 192a1 in a balanced manner.

In addition, referring to FIG. 11B, in another embodiment, for example, the center line of the first yoke 192a1 may be located within a range from 0 to K1 (K1 being a positive real number) toward the center line 203 of the first magnet 130-1 from the baseline 202 with respect to the center line 203 of the first magnet 130-1. For example, K1=K, however, the disclosure is not limited thereto.

The description of the first yoke 192a made with reference to FIGS. 10A and 10B may be equally applied to FIGS. 11A and 11B, except for disposition of the center line of the first yoke 192a1.

Also, in FIGS. 11A and 11B, the description of disposition of the first magnet 130-1 and the first yoke 192a1 may be equally applied to the second magnet 130-2 and the second yoke 192b.

Figure 12:
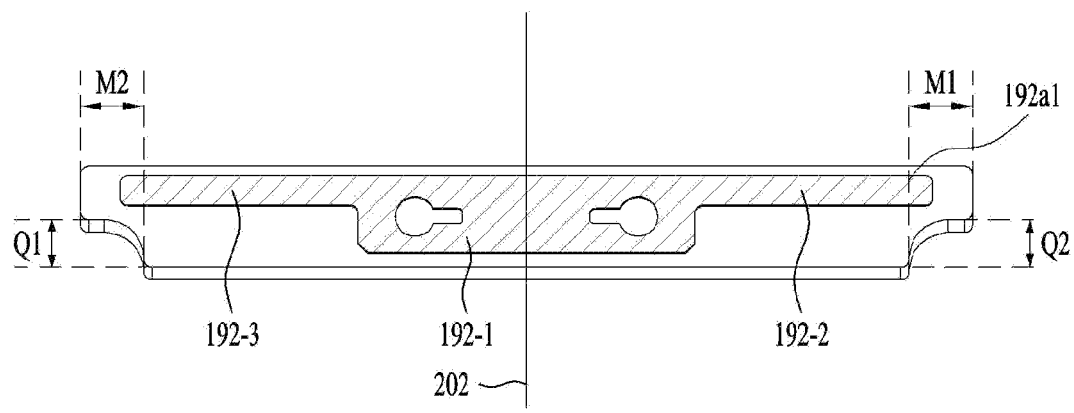
FIG. 12 shows disposition of a first yoke according to another embodiment.

FIG. 12 shows disposition of a first yoke 192a1 according to another embodiment.

In the embodiment shown in FIG. 12, the center line 203 of the first magnet 130-1 may be disposed so as to be aligned with the baseline 202. In addition, the first recess and the second recess of the first yoke 192a1 may have the same size.

For example, the horizontal length M1 of the first recess 10a may be equal to the horizontal length M2 of the second recess (M1=M2), and the vertical length Q1 of the first recess 10a may be equal to the vertical length Q2 of the second recess (Q1=Q2).

The first magnet 130-1 may be in a symmetrical fashion with respect to the baseline 202, and the first yoke 192a1 may be in a symmetrical fashion with respect to the baseline 202.

The description of the first magnet 130-1 and the first yoke 192a made with reference to FIGS. 10A and 10B may be equally applied to the embodiment of FIG. 12, except that the center line 203 of the first magnet 130-1 is aligned with the baseline 202 and that the size of the first recess and the size of the second recess are equal to each other. Also, in FIG. 12, the description of disposition of the first magnet 130-1 and the first yoke 192a1 may be equally applied to the second magnet 130-2 and the second yoke 192b.

Figure 13:
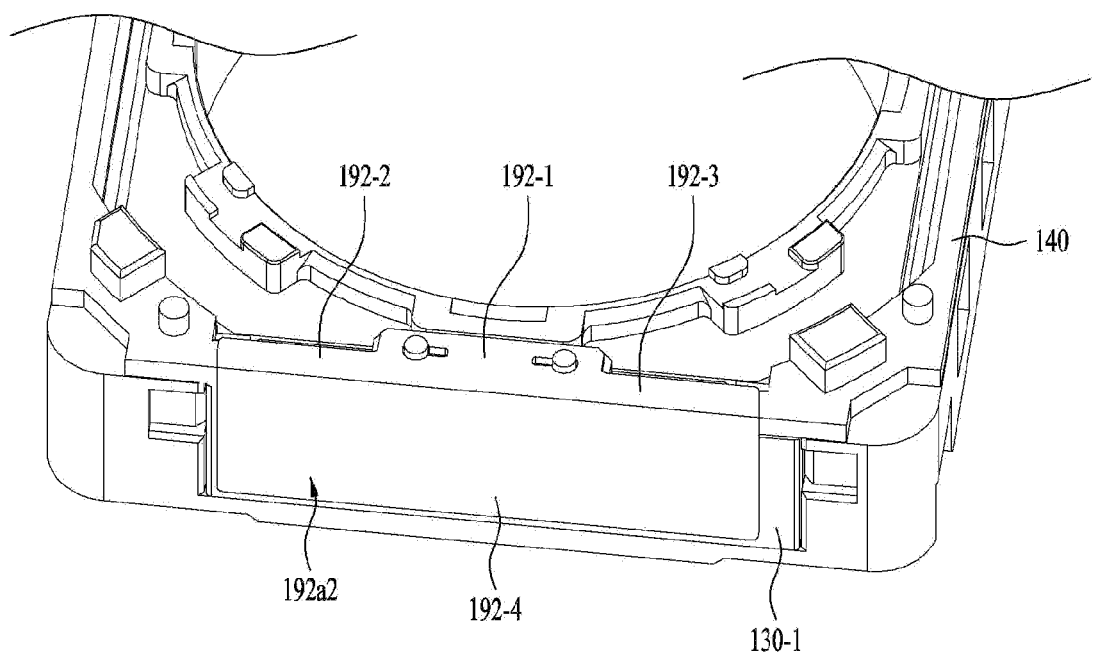
FIG. 13 shows a first yoke according to another embodiment.

FIG. 13 shows a first yoke 192a2 according to another embodiment.

Referring to FIG. 13, the first yoke 192a2 may include a body 192-1, a first extension portion 192-2, a second extension portion 192-3, and a third extension portion 192-4.

The third extension portion 192-4 may extend from at least one of the body 192-1, the first extension portion 192-2, or the second extension portion 192-3, and may be bent to the outer surface of the first side portion 141 of the housing 140.

For example, the third extension portion 192-4 may extend from one side surface of the body 192-1, one side surface of the first extension portion 192-2, and one side surface of the second extension portion 192-3, and may be bent to the outer surface of the first side portion 141 of the housing 140 at which the first magnet 130-1 is disposed.

The inner surface of the third extension portion 192-4 may abut the second side surface 53b of the first magnet 130-1, however, the disclosure is not limited thereto. In another embodiment, both may be spaced apart from each other.

One end of the third extension portion 192-4 may be located higher than the lower end of the first magnet 130-1, however, the disclosure is not limited thereto. In another embodiment, one end of the third extension portion 192-4 may be located lower than the lower end of the first magnet 130-1.

The third extension portion 192-4 may increase the intensity of electromagnetic force due to interaction between the coil 120 and the first magnet 130-1.

As shown in FIG. 2, each of the first yoke 192a and the second yoke 192b may be disposed on the upper surface of the upper elastic member 150, however, the disclosure is not limited thereto.

In another embodiment, the first yoke and the second yoke may be located between the upper elastic member 150 disposed on the upper surface of the housing 140 and the upper surface of the first magnet 130-1 disposed at the housing 140, and may be disposed at the first side portion 141 of the housing 140.

For example, the first yoke and the second yoke according to the embodiment may be located between the lower surface of the upper elastic member 150 and the upper surface of the first side portion of the housing 140, and may be inserted or settled into recesses provided in the upper surface of the first side portion 141 of the housing 140.

In another embodiment, the first yoke and the second yoke may be inserted or settled into recesses provided in the side surface of the first side portion of the housing 140 located between the upper surface of the first side portion of the housing 140 and the upper surface of the first magnet 130-1.

As shown in FIG. 2, the first yoke 192a is disposed so as to be spaced apart from the first magnet 130-1, and the second yoke 192b is disposed so as to be spaced apart from the second magnet 130-2, however, the disclosure is not limited thereto.

In another embodiment, the first yoke 192a may be disposed at the first side portion of the housing 140 located between the upper elastic member 150 and the first magnet 130-1 disposed at the housing 140. In this case, the lower surface of the first yoke 192a may contact the upper surface of the first magnet 130-1, however, the disclosure is not limited thereto. In another embodiment, both may be spaced apart from each other.

In addition, the second yoke 192b may be disposed at the first side portion of the housing 140 located between the upper elastic member 150 and the second magnet 130-2 disposed at the housing 140. In this case, the lower surface of the second yoke 192b may contact the upper surface of the second magnet 130-2, however, the disclosure is not limited thereto. In another embodiment, both may be spaced apart from each other.

In FIG. 13, the description of disposition of the first magnet 130-1 and the first yoke 192a2 may be equally applied to the second magnet 130-2 and the second yoke.

Figure 14A:
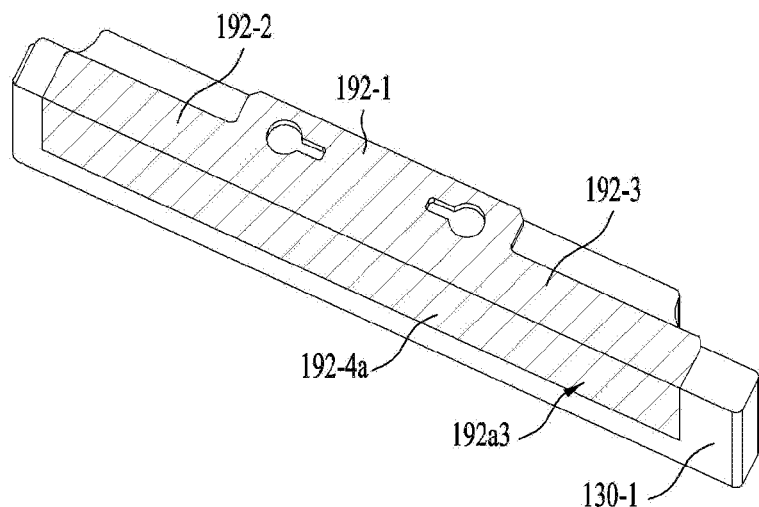
FIG. 14A shows disposition of the first magnet and a first yoke according to another embodiment.

FIG. 14A shows disposition of the first magnet 130-1 and a first yoke 192a3 according to another embodiment.

Referring to FIG. 14A, the first yoke 192a3 may be disposed at the first side portion of the housing 140 so as to abut the first magnet 130-1. For example, the lower surface of the first yoke 192a3 may contact the upper surface of the first magnet 130-1.

The first yoke 192a3 may include a body 192-1, a first extension portion 192-2, a second extension portion 192-3, and a third extension portion 192-4.

The body 192-1, the first extension portion 192-2, and the second extension portion 192-3 may be disposed on the upper surface of the first magnet 130-1, and the third extension portion 192-4 may be bent from at least one of the body 192-1, the first extension portion 192-2, or the second extension portion 192-3 to the second side surface 53b of the first magnet 130-1.

Figure 14B:
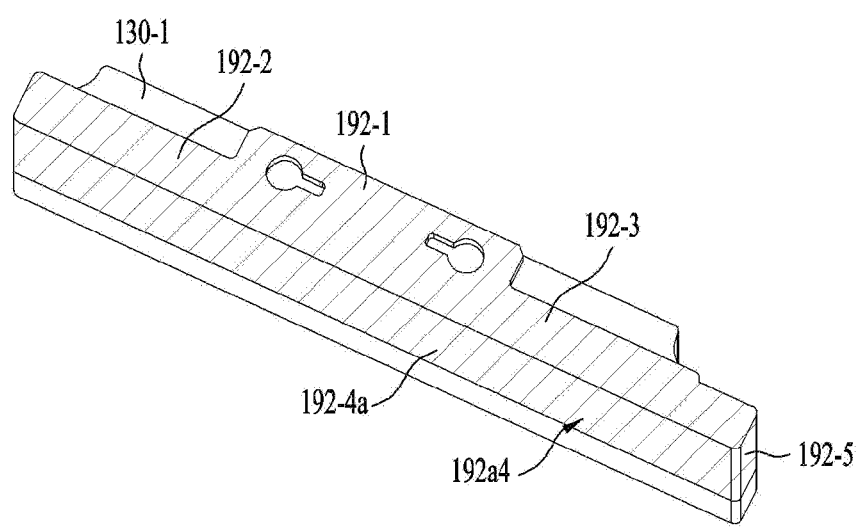
FIG. 14B shows a modification of FIG. 13.

FIG. 14B shows a modification of FIG. 13.

Referring to FIG. 14B, a first yoke 192a4 may include a body 192-1, a first extension portion 192-2, a second extension portion 192-3, a third extension portion 192-4, and a fourth extension portion 192-5.

The fourth extension portion 192-5 may extend from the first extension portion 192-2 and may then be bent to a third side surface of the first magnet 130-1, and may extend from the second extension portion 192-3 and may then be bent to a fourth side surface of the first magnet 130-1. The third side surface and the fourth side surface of the first magnet 130-1 may be located between the first side surface 53a and the second side surface 53b of the first magnet 130-1, and may face each other.

The third extension portion 192-4 or 192-4a and the fourth extension portion 192-5 of FIGS. 13, 14A, and 14B may increase the intensity of electromagnetic force due to interaction between the first magnet 130-1 and the coil 120.

The description of the first magnet 130-1 and the first yoke 192a3 or 192a4 of FIGS. 14A and 14B may be equally applied to a second yoke and a second magnet according to an embodiment corresponding thereto.

FIG. 15A shows displacement and tilt of the AF operation unit depending on driving current at room temperature when the yoke unit 190 according to the embodiment is not provided, and FIG. 15B shows a tilt value of displacement of the AF operation unit and sensitivity of the AF operation unit of FIG. 15A. The X axis indicates driving current applied to the coil 120, and the unit of the driving current is mA. The left Y axis indicates displacement of the AF operation unit, and the unit of the displacement of the AF operation unit may be μm. The right Y axis indicates tilt of a displacement graph of the AF operation unit. Sensitivity of the AF operation unit may be the ratio of the movement distance of the AF operation unit to driving current applied to the coil 120.

Referring to FIGS. 15A and 15B, a tilt value of displacement of the AF operation unit may be 0.033°, and sensitivity of the AF operation unit may be 4.108 μm/mA.

Figures 16B, 17A, 17B:
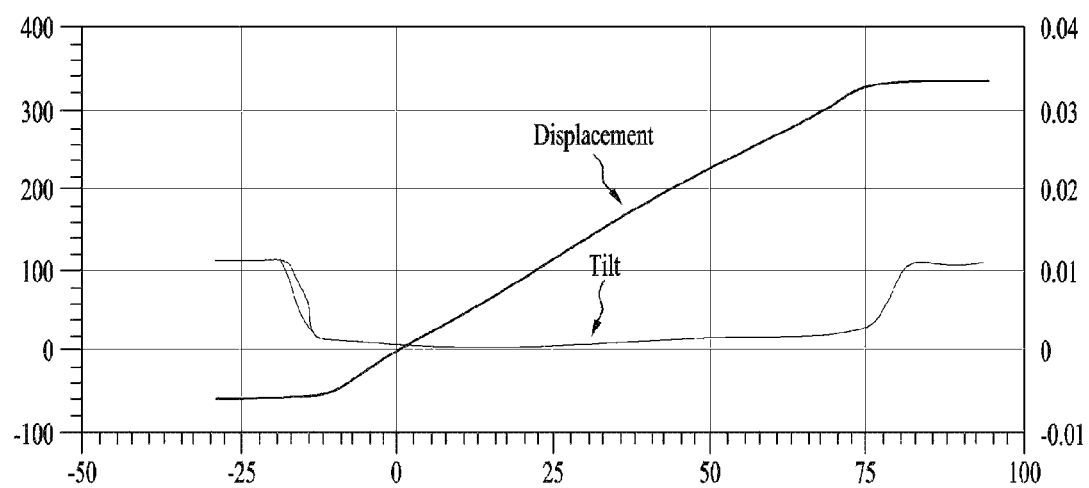
FIG. 16B shows a tilt value of displacement of the AF operation unit and sensitivity of the AF operation unit of FIG. 16A.
FIG. 17A shows displacement and tilt of the AF operation unit depending on driving current at room temperature when the yoke unit is provided.
FIG. 17B shows a tilt value of displacement of the AF operation unit and sensitivity of the AF operation unit of FIG. 17A.

FIG. 16A shows displacement and tilt of the AF operation unit depending on driving current at an ambient temperature of 99° C. when the yoke unit 190 according to the embodiment is not provided, and FIG. 16B shows a tilt value of displacement of the AF operation unit and sensitivity of the AF operation unit of FIG. 16A.

Referring to FIGS. 16A and 16B, a tilt value of displacement of the AF operation unit may be 0.052°, and sensitivity of the AF operation unit may be 3.365 μm/mA.

Compared to FIG. 15B, sensitivity of the AF operation unit of FIG. 16B is reduced by about 18%. The reason for this is that the magnet 130 is demagnetized when ambient temperature increases.

FIG. 17A shows displacement and tilt of the AF operation unit depending on driving current at room temperature when the yoke unit 190 is provided, and FIG. 17B shows a tilt value of displacement of the AF operation unit and sensitivity of the AF operation unit of FIG. 17A.

Referring to FIGS. 17A and 17B, sensitivity of the AF operation unit may be 4.519 μm/mA. Compared to FIG. 15B, sensitivity of the AF operation unit of FIG. 17B may be increased by about 10%. The reason for this is that electromagnetic force due to interaction between the magnet 130 and the coil 120 is increased by the yoke unit 190.

FIG. 18A shows displacement and tilt of the AF operation unit depending on driving current at an ambient temperature of 99° C. when the yoke unit 190 is provided, and FIG. 18B shows a tilt value of displacement of the AF operation unit and sensitivity of the AF operation unit of FIG. 18A.

Referring to FIGS. 18A and 18B, sensitivity of the AF operation unit may be 4.316 μm/mA. Compared to FIG.

17B, sensitivity of the AF operation unit of FIG. 18B is reduced by about 1.8% due to demagnetization of the magnet 130 caused by heat.

In the case of FIG. 16B, in which the yoke unit 190 is not provided, sensitivity of the AF operation unit of FIG. 18B is reduced by about 18% due to demagnetization of the magnet 130 caused by heat. However, in the case of FIG. 18B, in which the yoke unit 190 is provided, sensitivity of the AF operation unit of FIG. 18B is reduced by only about 1.8% due to demagnetization of the magnet 130 caused by heat. The reason for this is that demagnetization of the magnet 130 caused by heat can be restrained by the yoke unit 190. In the embodiment, therefore, it is possible to restrain demagnetization of the magnet 130 caused by heat, whereby it is possible to restrain reduction in electromagnetic force due to interaction between the coil 120 and the magnet 130 and to accurately perform the AF operation.

In the embodiment, as described above, it is possible to secure AF driving force through the first and second magnets 130-1 and 130-2 and the yoke unit 190 and to reduce magnetic field interference with an adjacent lens moving apparatus.

The lens moving apparatus 100 according to the above embodiment may further include a position sensor disposed at the housing 140 to perform AF feedback. At this time, the position sensor may be disposed at one of the side portions of the housing 140 at which no magnet is disposed.

In addition, the lens moving apparatus 100 may further include a sensing magnet disposed at the bobbin 110 so as to correspond to or to be opposite the position sensor. In addition, the lens moving apparatus 100 may further include a balancing magnet disposed at the bobbin 110 so as to correspond to or to be opposite the sensing magnet.

The lens moving apparatus 100 according to the above embodiment may be realized as a camera module or an optical instrument or may be used in various fields, such as those of a camera module or an optical instrument.

For example, the lens moving apparatus 100 according to the embodiment may be included in an optical instrument configured to form an image of an object in a space using reflection, refraction, absorption, interference, diffraction, etc., which are characteristics of light, to increase the visual power of the eyes, to record or reproduce an image formed by a lens, to perform optical measurement, or to propagate or transfer an image. For example, an optical instrument according to an embodiment may include a smartphone or a portable terminal equipped with a camera.

Figure 21:
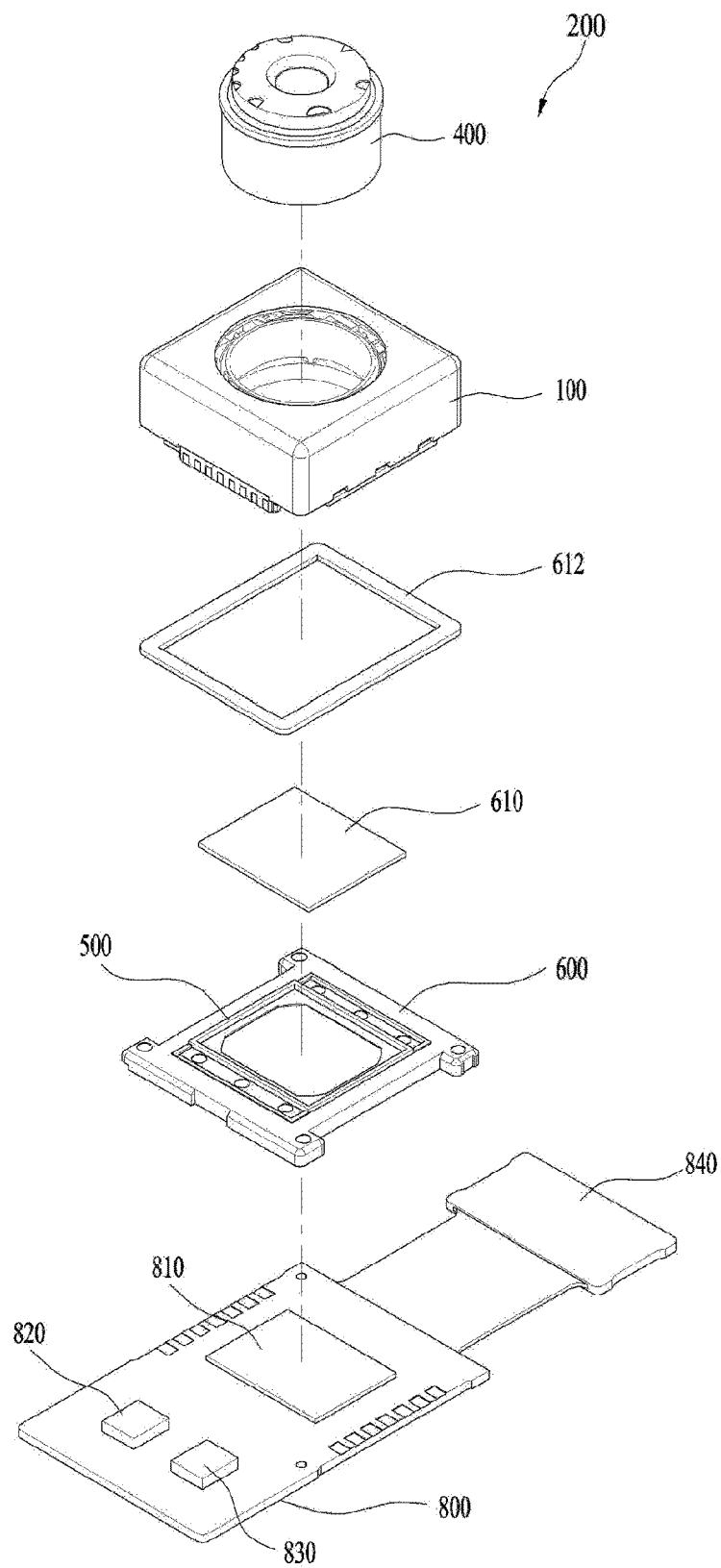
FIG. 21 is an exploded perspective view of a camera module according to an embodiment.

FIG. 21 is an exploded perspective view of a camera module 200 according to an embodiment.

Referring to FIG. 21, the camera module 200 may include a lens or a lens barrel 400, a lens moving apparatus 100, an adhesive member 612, a filter 610, a first holder 600, a second holder 800, an image sensor 810, a motion sensor 820, a controller 830, and a connector 840.

The lens or the lens barrel 400 may be mounted in the bobbin 110 of the lens moving apparatus 100.

The first holder 600 may be disposed under the base 210 of the lens moving apparatus 100. The filter 610 may be mounted to the first holder 600, and the first holder 600 may be provided with a protrusion, on which the filter 610 is settled.

The adhesive member 612 may couple or adhere the base 210 of the lens moving apparatus 100 to the first holder 600. For example, the adhesive member 612 may be epoxy, a thermo-hardening adhesive, or an ultraviolet-hardening adhesive.

The filter 610 may function to inhibit a specific-frequency-band component of light passing through the lens barrel 400 from being incident on the image sensor 810. The filter 610 may be an infrared cutoff filter, however, the disclosure is not limited thereto. At this time, the filter 610 may be disposed parallel to the x-y plane.

An opening, through which light passing through the filter 610 is incident on the image sensor 810, may be provided in the region of the first holder 600 on which the filter 610 is mounted.

The second holder 800 may be disposed under the first holder 600, and the image sensor 810 may be mounted on the second holder 600. The image sensor 810 is a region on which light passing through the filter 610 is incident in order to form an image including the light.

The second holder 800 may be provided with various circuits, elements, and a controller in order to convert an image formed on the image sensor 810 into an electrical signal and transfer the electrical signal to an external apparatus. The second holder 800 may be realized as a circuit board, on which the image sensor may be mounted, on which a circuit pattern may be formed, and on which various elements are coupled to each other. The first holder 600 may also be referred to as a "holder" or a "sensor base," and the second holder 800 may also be referred to as a "board" or a "circuit board."

The image sensor 810 may receive an image included in light incident through the lens moving apparatus 100, and may convert the received image into an electrical signal.

The filter 610 and the image sensor 810 may be disposed so as to be spaced apart from each other in the state of being opposite each other in the first direction.

The motion sensor 820 may be mounted on the second holder 800, and may be connected to the controller 830 via the circuit pattern provided on the second holder 800.

The motion sensor 820 outputs information about rotational angular velocity based on movement of the camera module 200. The motion sensor 820 may be realized as a two-axis or three-axis gyro sensor or an angular velocity sensor.

The controller 830 is mounted on the second holder 800. The second holder 800 may be connected to the lens moving apparatus 100. For example, the second holder 800 may be connected to the coil 120 of the lens moving apparatus 100. In the case in which the lens moving apparatus includes a position sensor, the second holder 800 may be connected to the position sensor.

For example, a driving signal may be provided to the coil 120 through the second holder 800. In the case in which the lens moving apparatus includes a position sensor, a driving signal may be provided to the position sensor through the second holder 800. An output signal of the position sensor may be transmitted to the second holder 800, and the output signal of the position sensor may be received by the controller 830.

The connector 840 may be connected to the second holder 800, and may have a port for connection with an external apparatus.

Figure 22:
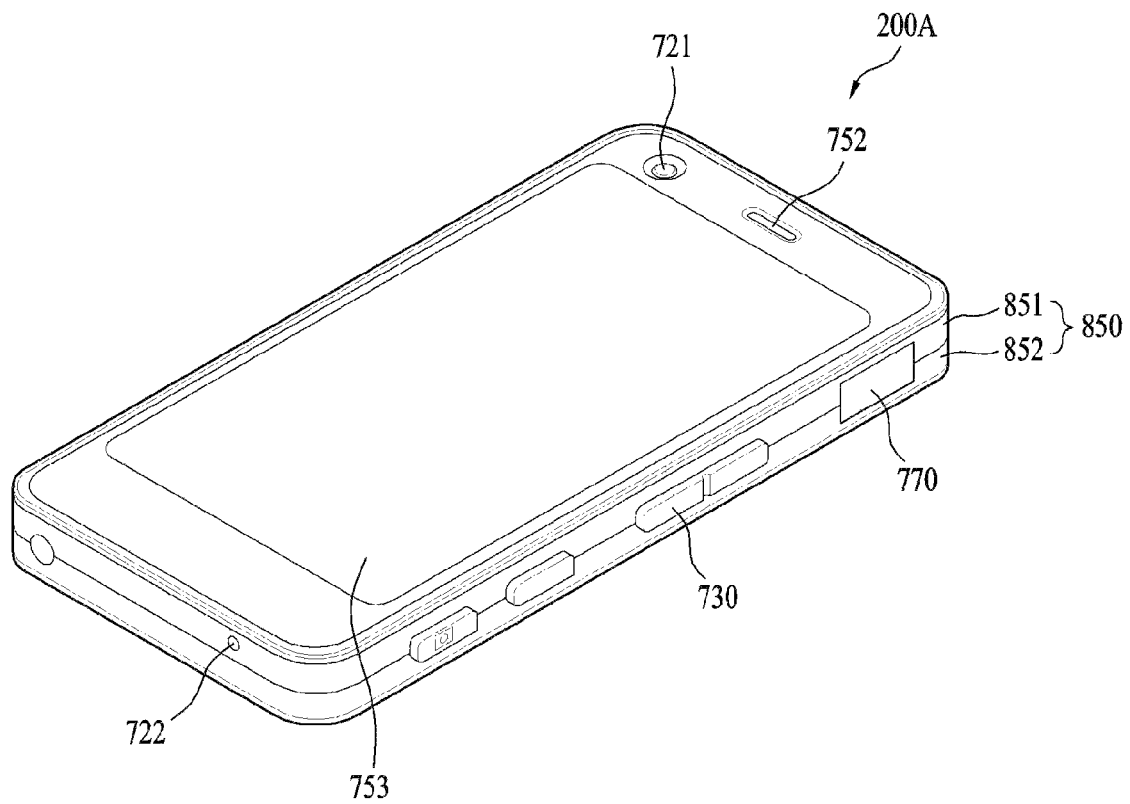
FIG. 22 is a perspective view of a portable terminal according to an embodiment.
Figure 23:
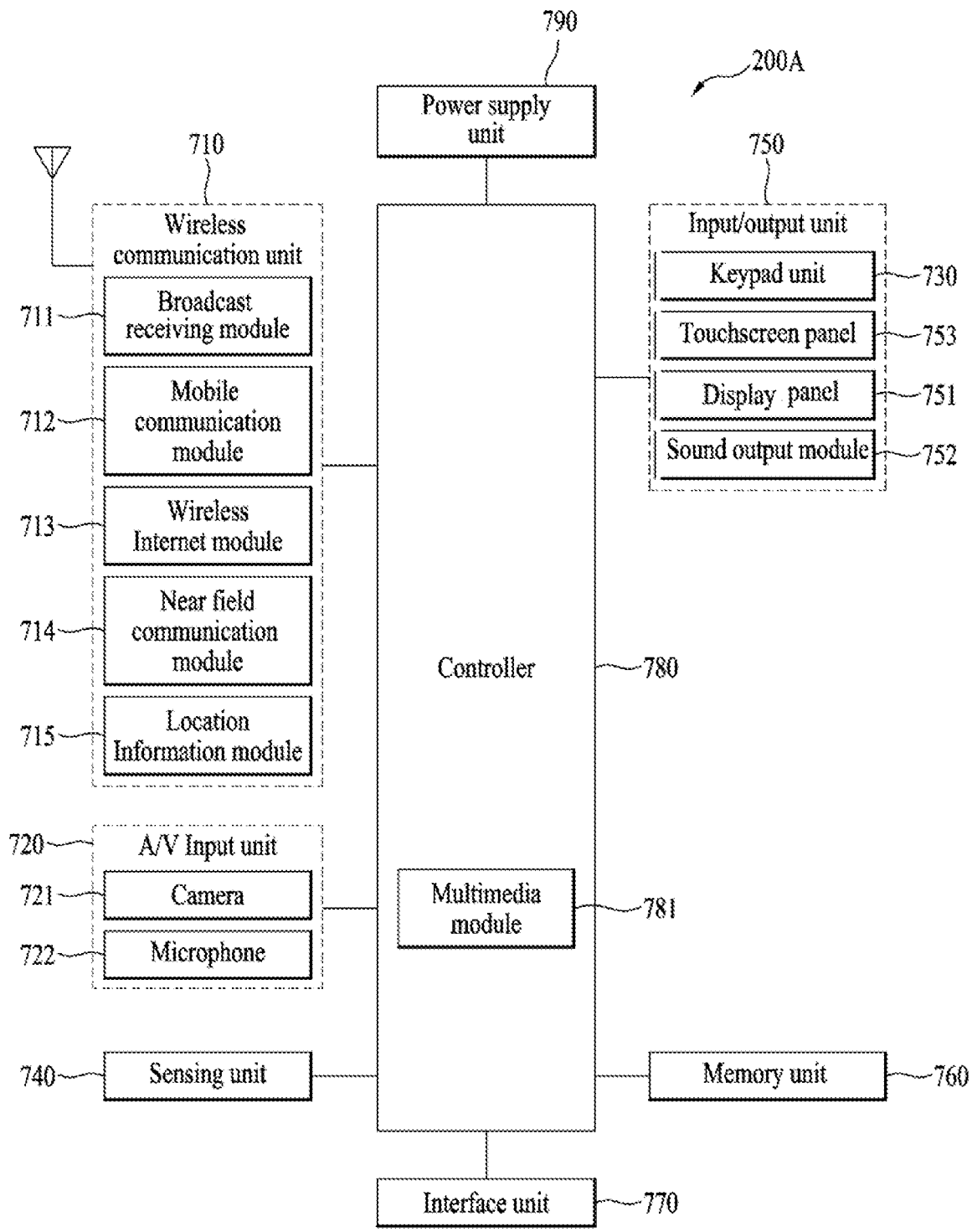
FIG. 23 shows the construction of the portable terminal shown in FIG. 22.

FIG. 22 is a perspective view of a portable terminal 200A according to an embodiment, and FIG. 23 shows the construction of the portable terminal 200A shown in FIG. 22.

Referring to FIGS. 22 and 23, the portable terminal 200A (hereinafter referred to as a "terminal") may include a body 850, a wireless communication unit 710, an A/V input unit 720, a sensing unit 740, an input/output unit 750, a memory unit 760, an interface unit 770, a controller 780, and a power supply unit 790.

The body 850 shown in FIG. 22 has a bar shape, however, the disclosure is not limited thereto. The body may have any of various structures, such as a slide type structure, a folder type structure, a swing type structure, and a swivel type structure, in which two or more sub-bodies are coupled so as to be movable relative to each other.

The body 850 may include a case (casing, housing, cover, etc.) that defines the external appearance thereof. For example, the body 850 may be divided into a front case 851 and a rear case 852. Various electronic parts of the terminal may be mounted in a space defined between the front case 851 and the rear case 852.

The wireless communication unit 710 may include one or more modules that enable wireless communication between the terminal 200A and a wireless communication system or between the terminal 200A and a network in which the terminal 200A is located. For example, the wireless communication unit 710 may include a broadcast receiving module 711, a mobile communication module 712, a wireless Internet module 713, a nearfield communication module 714, and a location information module 715.

The A/V (audio/video) input unit 720, which is provided to input an audio signal or a video signal, may include a camera 721 and a microphone 722.

The camera 721 may include a camera module 200 according to the embodiment shown in FIG. 21.

The sensing unit 740 may sense the current state of the terminal 200A, such as the opening and closing state of the terminal 200A, the position of the terminal 200A, whether a user contacts the terminal, the orientation of the terminal 200A, and acceleration/deceleration of the terminal 200A, in order to generate a sensing signal for controlling the operation of the terminal 200A. For example, in the case in which the terminal 200A is a slide phone, the sensing unit may sense whether the slide phone is open or closed. In addition, the sensing unit senses whether power is supplied from the power supply unit 790 and whether the interface unit 770 is coupled to an external instrument.

The input/output unit 750 is provided to generate input or output related to visual sensation, audible sensation, or tactile sensation. The input/output unit 750 may generate input data for controlling the operation of the terminal 200A, and may display information processed by the terminal 200A.

The input/output unit 750 may include a keypad unit 730, a display panel 751, a sound output module 752, and a touchscreen panel 753. The keypad 730 may generate input data through keypad input.

The display panel 751 may include a plurality of pixels, the color of which is changed according to an electrical signal. For example, the display panel 751 may include at least one of a liquid crystal display, a thin film transistor-liquid crystal display, an organic light-emitting diode, a flexible display, or a three-dimensional (3D) display.

The sound output module 752 may output audio data received from the wireless communication unit 710 in a call signal reception mode, a telephone communication mode, a recording mode, a voice recognition mode, or a broadcast reception mode, or may output audio data stored in the memory unit 760.

The touchscreen panel 753 may convert a change in capacitance due to a user's touch on a specific region of the touchscreen into an electrical input signal.

The memory unit 760 may store a program for processing and control of the controller 780, and may temporarily store input/output data (for example, a telephone directory, messages, audio, still images, photographs, and video). For example, the memory unit 760 may store images, such as photographs or video, captured by the camera 721.

The interface unit 770 functions as a path for connection between the terminal 200A and an external instrument. The interface unit 770 may receive data from the external instrument, may receive electric power and transmit the received electric power to internal components of the terminal 200A, or may transfer data in the terminal 200A to the external instrument. For example, the interface unit 770 may include a wired/wireless headset port, an external charger port, a wired/wireless data port, a memory card port, a port for connection with an apparatus having an identification module, an audio input/output (I/O) port, a video input/output (I/O) port, and an earphone port.

The controller 780 may control the overall operation of the terminal 200A. For example, the controller 780 may perform related control and processing for voice communication, data communication, and video communication.

The controller 780 may have a multimedia module 781 for multimedia reproduction. The multimedia module 781 may be realized in the controller 780 or may be realized separately from the controller 780.

The controller 780 may perform pattern recognition processing that is capable of recognizing writing input or drawing input performed on the touchscreen as text or an image, respectively.

The power supply unit 790 may receive external power and internal power and supply required power to respective components under control of the controller 780.

The features, structures, and effects described in the above embodiments are included in at least one embodiment, but are not limited only to one embodiment. Furthermore, features, structures, and effects illustrated in each embodiment may be combined or modified in other embodiments by those skilled in the art to which the embodiments pertain. Therefore, it is to be understood that such combinations and modifications fall within the scope of the present disclosure.

INDUSTRIAL APPLICABILITY

Embodiments may be used in a lens moving apparatus capable of securing AF driving force and reducing magnetic field interference with an adjacent lens moving apparatus, and a camera module and an optical instrument including the same.

The invention claimed is:
1. A lens moving apparatus comprising:
a housing;
a bobbin disposed in the housing;
a coil disposed on the bobbin;
a magnet disposed on a side portion of the housing;
an upper elastic member coupled to an upper portion of the housing and an upper portion of the bobbin; and
a yoke disposed on an upper surface of the upper elastic member so as to be positioned higher than the upper elastic member,
wherein the yoke is not in contact with the magnet,
wherein the yoke comprises:
  a body portion;
  a first extension portion extending from the body portion in a first direction; and
  a second extension portion extending from the body portion in a second direction opposite to the first direction,
wherein the first direction and the second direction are parallel to the side portion of the housing, wherein the body portion and the first and second extension portions overlap the magnet in an optical axis direction, and wherein a length of each of the first and second extension portions in a third direction is smaller than a length of the body portion in the third direction, and the third direction is perpendicular to the first direction and the optical axis direction.

2. The lens moving apparatus according to claim 1, comprising a cover member comprising an upper plate and a side plate opposite to the side portion of the housing, wherein the housing is disposed in the cover member.

3. The lens moving apparatus according to claim 1, wherein the yoke is made of a magnetic material.

4. The lens moving apparatus according to claim 1, wherein the yoke is disposed in a symmetrical fashion with respect to a baseline, and wherein the baseline is a straight line that passes through a center of the housing and that is perpendicular to an outer surface of the side portion of the housing at which the magnet is disposed.

5. The lens moving apparatus according to claim 4, wherein the magnet is disposed in a symmetrical fashion with respect to the baseline.

6. The lens moving apparatus according to claim 1, comprising:
a lower elastic member coupled to a lower portion of the housing and a lower portion of the bobbin.

7. The lens moving apparatus according to claim 1, wherein the yoke has a T shape.

8. The lens moving apparatus according to claim 1, wherein the bobbin is configured to move in a first direction parallel to an optical axis by an interaction between the coil and the magnet.

9. The lens moving apparatus according to claim 1, comprising:
a sensing magnet disposed on the bobbin; and
a position sensor configured to detect the sensing magnet.

10. The lens moving apparatus according to claim 1, wherein the yoke is configured to increase an intensity of electromagnetic force due to an interaction between the coil and the magnet.

11. The lens moving apparatus according to claim 1, wherein the yoke contacts an upper surface of the upper elastic member.

12. The lens moving apparatus according to claim 1, comprising:
a cover member for receiving the housing, the bobbin, the coil, the magnet and the yoke; and
a base disposed under the housing,
wherein a lower end of a side plate of the cover member is coupled to an upper portion of the base.

13. A camera module comprising:
a lens;
the lens moving apparatus according to claim 1; and
an image sensor.

14. A lens moving apparatus comprising:
a housing comprising a side portion;
a bobbin disposed in the housing;
a coil disposed on the bobbin;
a magnet disposed in the side portion of housing;
an upper elastic member coupled to an upper surface of the housing and an upper surface of the bobbin; and
a yoke disposed on the side portion of the housing,
wherein the yoke comprises:
a body portion;
a first extension portion extending from the body portion in a first direction; and
a second extension portion extending from the body portion in a second direction opposite to the first direction,
wherein the first direction and the second direction are parallel to the side portion of the housing,
wherein the body portion and the first and second extension portions overlap the magnet in an optical axis direction,
wherein the yoke is not in contact with the magnet, and
wherein the yoke is positioned higher than the upper elastic member and contacts an upper surface of the upper elastic member.

15. The lens moving apparatus according to claim 14, comprising a cover member comprising an upper plate and a side plate opposite to the side portion of the housing,
wherein the housing is disposed in the cover member.

16. The lens moving apparatus according to claim 14, wherein the yoke is disposed in a symmetrical fashion with respect to a baseline, and
wherein the baseline is a straight line that passes through a center of the housing and that is perpendicular to an outer surface of the side portion of the housing at which the magnet is disposed.

17. The lens moving apparatus according to claim 14, comprising:
a lower elastic member coupled to a lower portion of the housing and a lower portion of the bobbin.

18. The lens moving apparatus according to claim 14, wherein a length of each of the first and second extension portions in a third direction is smaller than a length of the body portion in the third direction, and the third direction is perpendicular to the first direction and the optical axis direction.

19. The lens moving apparatus according to claim 14, wherein the yoke is made of a magnetic material, and
wherein the yoke is configured to increase an intensity of electromagnetic force due to an interaction between the coil and the magnet.

* * * * *